(12) United States Patent
Wang et al.

(10) Patent No.: US 10,858,571 B2
(45) Date of Patent: Dec. 8, 2020

(54) HIGH-TEMPERATURE RETARDER SUITABLE FOR OIL AND GAS WELL CEMENTATION, PREPARATION METHOD THEREOF AND CEMENTING SLURRY

(71) Applicants: China University of Petroleum (East China), Qingdao (CN); Chengdu OMAX Petroleum Technology Co., Ltd, Chengdu (CN)

(72) Inventors: Chengwen Wang, Qingdao (CN); Yucheng Xue, Qingdao (CN); Wei Zhou, Qingdao (CN); Ruihe Wang, Qingdao (CN); Jinsheng Sun, Qingdao (CN); Yong Li, Qingdao (CN); Changqiang Tang, Qingdao (CN)

(73) Assignees: CHINA UNIVERSITY OF PETROLEUM (EAST CHINA), Qingdao (CN); CHENGDU OMAX PETROLEUM TECHNOLOGY CO., LTD, Chengdu (CN)

( * ) Notice: Subject to any disclaimer, the term of this patent is extended or adjusted under 35 U.S.C. 154(b) by 0 days.

(21) Appl. No.: 16/752,971

(22) Filed: Jan. 27, 2020

(65) Prior Publication Data
US 2020/0239760 A1   Jul. 30, 2020

(30) Foreign Application Priority Data

Jan. 28, 2019   (CN) .......................... 2019 1 0079155
Jan. 28, 2019   (CN) .......................... 2019 1 0079157

(51) Int. Cl.
| | |
|---|---|
| *C09K 8/467* | (2006.01) |
| *C04B 28/02* | (2006.01) |
| *C04B 40/00* | (2006.01) |
| *C04B 24/16* | (2006.01) |
| *C08F 220/58* | (2006.01) |
| *C04B 103/22* | (2006.01) |

(52) U.S. Cl.
CPC ............ *C09K 8/467* (2013.01); *C04B 24/163* (2013.01); *C04B 28/02* (2013.01); *C04B 40/0039* (2013.01); *C08F 220/585* (2020.02); *C04B 2103/22* (2013.01); *C08F 2800/20* (2013.01)

(58) Field of Classification Search
CPC .. C09K 8/467; C08F 220/585; C04B 2103/22
See application file for complete search history.

(56) References Cited

U.S. PATENT DOCUMENTS

2010/0197529 A1* 8/2010 Favero ................... C09K 8/588
507/222

* cited by examiner

*Primary Examiner* — Aiqun Li
(74) *Attorney, Agent, or Firm* — Volpe Koenig

(57) ABSTRACT

The present disclosure relates to a high-temperature retarder suitable for oil and gas well cementation, a preparation method thereof and a cementing slurry.

6 Claims, 2 Drawing Sheets

HIGH-TEMPERATURE RETARDER SUITABLE FOR OIL AND GAS WELL CEMENTATION, PREPARATION METHOD THEREOF AND CEMENTING SLURRY

The application claims priority to Chinese Application No. 201910079155.1, filed on Jan. 28, 2019, entitled "A temperature-responsive high-temperature retarder suitable for oil and gas well cementation, preparation method thereof and cementing slurry", and Chinese Application No. 201910079157.0, filed on Jan. 28, 2019, entitled "A temperature-adaptive high-temperature retarder suitable for oil and gas well cementation, preparation method thereof and cementing slurry", which are specifically and entirely incorporated by reference.

FIELD

The present disclosure relates to the technical field of oil and gas well development, particularly relates to a high-temperature retarder suitable for oil and gas well cementation, a preparation method of the high-temperature retarder suitable for oil and gas well cementation, and a cementing slurry comprising the high-temperature retarder.

BACKGROUND

With the continuous exploitation of exiting shallow oil and gas resources in China, most of the shallow oil and gas resources in China are close to exhaustion sequentially, the available and easily recoverable oil and gas reserves are limited, and the task of increasing and stabilizing the oil yield faces with increasing difficulty. In order to increase the yield of crude oil, the oil and gas exploration and development in the future will gradually shift to deep wells, ultra-deep wells and complex stratum. The outstanding difficulties of the deep well and ultra-deep well cementation operation include that the formation temperature is high, the well cementation confronts with serious problem of high temperature, thus it is critical to search a solution concerning how to effectively control the reasonable densifying time of the cementing slurry. Meanwhile, together with the current new requirements of simplifying well structure, saving cost and improving drilling efficiency, the deep well cementation faces more and more difficult problems of one-time long cementing solid section for cementation. The problem concerning the long cementing section for cementation is that the one-time upward-returning sealing section is long, the temperature difference between the top and the bottom of the sealing section is large, the use effect of most additives is seriously influenced, and the cementation quality is directly influenced. The problems present more challenges to the design of well cementation projects, particularly the cementing slurry. Because the cement slurry systems are generally designed based on the bottom hole temperature, in order to ensure the safe pumping of cement slurry under the high temperature condition, a large amount of traditional high-temperature retarder is usually added to fulfill the purposes of prolonging densifying time, improving rheological property and prolonging pumpable time; however, while the retarder adapts to the environment with extremely high temperature and pressure, because of the decomposition, the settlement stability of the cement slurry is deteriorated, the phenomena of excessive dispersion and obvious reduction of consistency occur, the retarding effect is reduced, the cement slurry has serious sedimentation phenomenon; in the meanwhile, the exiting high-temperature retarder is prone to generate delayed coagulation or even super-delayed coagulation in a low-temperature environment at the top of the sealing section, so that the strength of upper cement of cement slurry is slowly formed in the process of waiting for coagulation, the cement slurry cannot be solidified for some time or even a long time, it neither form the gel state nor transfer the liquid column pressure, such that the conditions of liquid channeling and the like are caused, and the effective sealing of a stratum cannot be realized.

Therefore, the high requirement of the extremely-high temperature and pressure environment at the bottom of the well on the retarding effect and the delayed coagulation effect of the large temperature difference formed by the long sealing solid section are the key technical problems for the high-temperature long-sealing solid section well cementation, the retarder is critical for solving the problems. The currently used medium-temperature retarder and the high-temperature retarder have unsatisfactory use effects and some defects and limitations, in particular, it cannot ensure a further improvement of the early strength of set cements at low temperature while securely pumping cement slurry at high temperature. In addition, the existing high-temperature retarder easily causes excessive dispersion of cement slurry, has a lot of defects in the aspects of controlling the settlement stability of the cement slurry, and cannot substantially ensure the well cementation quality of an oil well.

CN106632842A discloses an oil well cement delayed coagulant, which comprises 2-6 parts by mass of alkene monomers (sodium methallyl sulfonate, sodium p-styrene sulfonate, 2-acrylamide-2-methylpropanesulfonic acid) with anionic sulfonic acid groups, 1-6 parts by mass of alkene monomers (acrylamide ethyl trimethyl ammonium chloride, methacryloxyethyl trimethyl ammonium chloride, dimethyl diallyl ammonium chloride) with ammonium cations and 8-15 parts by mass of unsaturated monomers (maleic anhydride, itaconic acid, acrylic acid) with carboxylic acid groups, and the applicable temperature is 50-150° C. But the delayed coagulant still lacks a sufficiently high early compression strength at low temperature.

CN106085389A discloses a high-temperature-resistant oil-well cement retarder, which comprises three structural units of sodium p-styrenesulfonate, maleic acid or itaconic acid, and N-vinylcaprolactam, wherein the sodium styrene sulfonate, the maleic acid or the itaconic acid, and the N-vinylcaprolactam are mixed according to the mass ratio of 10-17:2-7:1-3 for synthesis. The cement retarder possesses high temperature resistance as well as the high temperature settlement stability, and keeps the consistency of cement slurry around a certain value. But the retarder still lacks a sufficiently high early compression strength at low temperature.

CN101967371A discloses a high temperature resistant oil well cement retarder, which comprises 2-methyl-2-acrylamido propanesulfonic Acid (AMPS), Itaconic Acid (IA), Acrylamide (AM) and N, N-dimethylaminopropyl acrylamide (DMAPAA) in a mass ratio of 82-91:10-26:8-30:31-38, and the cement retarder has a temperature resistance of 180° C., has rapid development of set cement strength under medium and low temperature conditions, but the retarder has strong dispersibility and exhibits some defects in settlement stability.

The Chinese patent document CN103923253A discloses an oil well cement retarder with a high-temperature control-release and delayed-coagulation groups, the cement retarder comprises itaconic acid, hydroxyethyl methacrylate, 2-acrylamide-2-methylsulfonate, and one hydroxymethyl propane acrylate compound with two or more alkene unsaturated bonds, wherein the itaconic acid, the hydroxyethyl methacrylate, the hydroxymethyl propane acrylate compound and the 2-acrylamide-2-methylpropanesulfonic acid are mixed according to a molar ratio of 1.0-1.5:2.0-3.0:0.5-1.0:0.1-0.5:8.0-10.0 for synthesis. The cement retarder can resist the temperature of 150° C., the densifying time of cement slurry added with the retarder becomes insensitive to the temperature, and the set cement strength can be developed quickly under the conditions of low temperature, medium temperature and high temperature. But the temperature resistance and the early strength of the set cement of the retarder are still not high enough.

In regard to the problems of the existing retarders, a variety of synthetic polymers are disclosed as oil well cement retarders, but the retarder still has certain defects in the aspects of settlement stability, temperature response characteristics, low-temperature strength development and the like. Most of polymer high-temperature retarders are still binary or multi-component copolymers of 2-acrylamide-2-methylprop anesulfonic Acid (AMPS) and other carboxyl-containing monomers or other polymers, and the high-temperature retarders still need to be improved in the aspects of material grafting, modification, polymer material synthesis and so forth, and are required to be deeply researched and developed.

Therefore, it is urgent to develop a high-temperature retarder, wherein the retarding capability of the retarder under different temperature conditions is adjusted by regulating the form distribution and the adsorption state of the retarder in cement slurry, the densifying time at high temperature meets the construction requirement; in the meanwhile, the strength of cement can be developed quickly under the low-temperature condition, so as to ensure the safety of well cementation construction and improve the overall well cementation quality.

SUMMARY

To overcome the problems of the retarder in the prior art that the retarder still has defects in the aspects of settlement stability, temperature response characteristic, low-temperature strength development and the like, and provides a high-temperature retarder suitable for oil-gas well cementation, preparation method thereof and cementing slurry, the high-temperature retarder can avoid the settlement problem caused by poor stability of cement slurry, and the cement slurry has high early strength at low temperature, and can avoid the problem that the cement strength at the well cementation upper part of a long sealing solid section is slowly formed due to delayed coagulation or even super-delayed coagulation.

In order to fulfill the above purposes, a first aspect of the present disclosure provides a high temperature retarder comprising a structural unit a represented by Formula (1), a structural unit B represented by Formula (2), and a structural unit C represented by Formula (3);

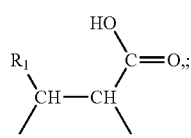

Formula (1)

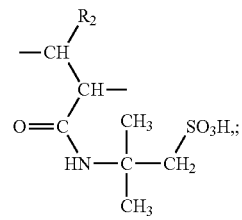

Formula (2)

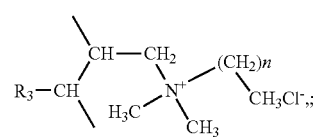

Formula (3)

wherein the structural percentages of structural unit A, structural unit B, and structural unit C are x, y, and z, and x=37.2-57.23%, y=40.52-61.4%, z=1.38-4.35%, and the sum of x, y, and z is 1;

wherein $R_1$, $R_2$ and $R_3$ are the same or different, each is independently H, or a substituted or unsubstituted alkyl of $C_1$-$C_4$;

wherein n is 11, 13, 15, 17, 19 or 21.

The second aspect of the present disclosure provides a high-temperature retarder comprising a structural unit E shown in Formula (5), a structural unit B shown in Formula (2), a structural unit C shown in Formula (3) and a structural unit D shown in Formula (4);

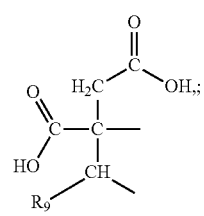

Formula (5)

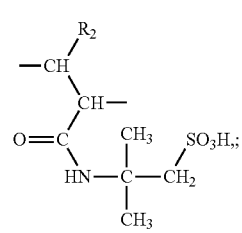

Formula (2)

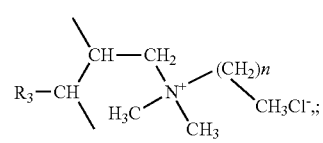

Formula (3)

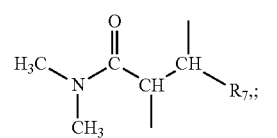

Formula (4)

wherein the structural percentages of structural units E, B, C and D are q, m, n and p, and p=7.18-10.76%, q=40.22-64.66%, m=25.86-46.25%, n=1.05-3.8%, and the sum of p, q, m, n is 1;

wherein $R_9$, $R_2$, $R_3$ and $R_7$ are the same or different, and each is independently H or a substituted or unsubstituted alkyl of $C_1$-$C_4$;

wherein n is 11, 13, 15, 17, 19 or 21.

A third aspect of the present disclosure provides a cementing slurry, wherein the cementing slurry comprises a high-temperature retarder; wherein the dosage of the high-temperature retarder is 0.2-2 wt % based on the total weight of the cementing slurry;

wherein the high-temperature retarder contains a structural unit E shown in Formula (5), a structural unit B shown in Formula (2), a structural unit C shown in Formula (3) and a structural unit D shown in Formula (4);

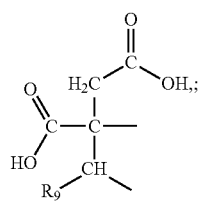

Formula (5)

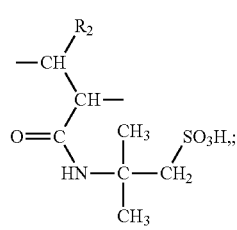

Formula (2)

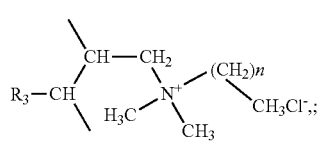

Formula (3)

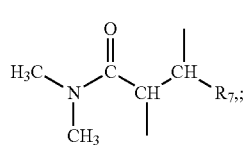

Formula (4)

wherein the structural percentages of structural units E, B, C and D are q, m, n and p, and p=7.18-10.76%, q=40.22-64.66%, m=25.86-46.25%, n=1.05-3.8%, and the sum of p, q, m, n is 1;

wherein $R_9$, $R_2$, $R_3$ and $R_7$ are the same or different, and each is independently H or a substituted or unsubstituted alkyl of $C_1$-$C_4$;

wherein n is 11, 13, 15, 17, 19 or 21.

Due to the aforementioned technical solution, the high-temperature retarder has high-temperature resistance and does not influence the settlement stability of cement slurry at high temperature, can effectively prolong the densifying time of oil well cement slurry, and has high early strength of the set cement at low temperature. The high-temperature retarder disclosed by the present disclosure is subjected to hydrophobic association and agglomeration under the hydrophobic action of the long-carbon alkyl side chain at a low temperature (50° C.), so that the functional groups with the retarding action are wrapped and bound, thereby preventing the effects of extension, dispersion and adsorption of retarder molecules in an aqueous solution on cement particles and the like, weakening the retarding action of the retarder molecules on cement, and effectively solving the problem that the strength of cement slurry at the top is slowly developed or even is excessively retarded; along with the rise of temperature, the hydrophobic association effect of the long-carbon alkyl side chain is gradually weakened, the functional groups with the retarding effect are gradually opened and released, the retarder molecules continuously stretch and disperse in an aqueous solution and are partially adsorbed on the surfaces of cement particles, so that the retarding effect is stronger and stronger, and the densifying time of cement slurry is effectively prolonged; under a medium temperature (90° C.), most of the retarding groups are tightly wrapped and covered by the curled long carbon alkane side chains, and a small part of the retarding groups extend due to the opening of an agglomerated structure, such that the retarding effect is increased; at a high temperature (180° C.), the hydrophobic association effect of the long carbon chain alkyl side chain disappears, the functional group with the retarding effect is completely released, the retarding functional group and the long carbon chain alkyl in the retarder molecule are completely extended, dispersed and fully adsorbed on the surface of cement particles in the aqueous solution, and the very strong high-temperature retarding effect is shown, so that the high-temperature densifying time of cement slurry is effectively controlled. Meanwhile, by controlling the functional groups with the retarding function to be gradually released along with the temperature rise, the side effect of excessive dispersion of the retarder may be effectively weakened, it is conducive to the settlement stability of the slurry.

Another purpose of the present disclosure is to provide a preparation method of the high-temperature retarder for well cementation and cementing slurry, wherein the method is reliable in principle and simple to operate. After the retarder prepared by the method is added into cement slurry, the densifying curve is stable, the densifying time of the cement slurry can be effectively prolonged, the change of the slurry consistency is small under the high-temperature condition, the sedimentation problem caused by the poor stability of the cement slurry can be avoided, in addition, the cement slurry has high early strength at low temperature and can avoid the problem that the cement strength at the well cementation upper part of a long sealing solid section is slowly formed due to delayed coagulation or even super-delayed coagulation.

BRIEF DESCRIPTION OF THE DRAWINGS

The accompanying drawings, which are used for facilitating the further understanding of the present disclosure and constitute a part of the description, serve to illustrate the present disclosure together with the following specific embodiments, and do not impose a limitation to the present disclosure. In the drawings.

DETAILED DESCRIPTION

Figure 1:
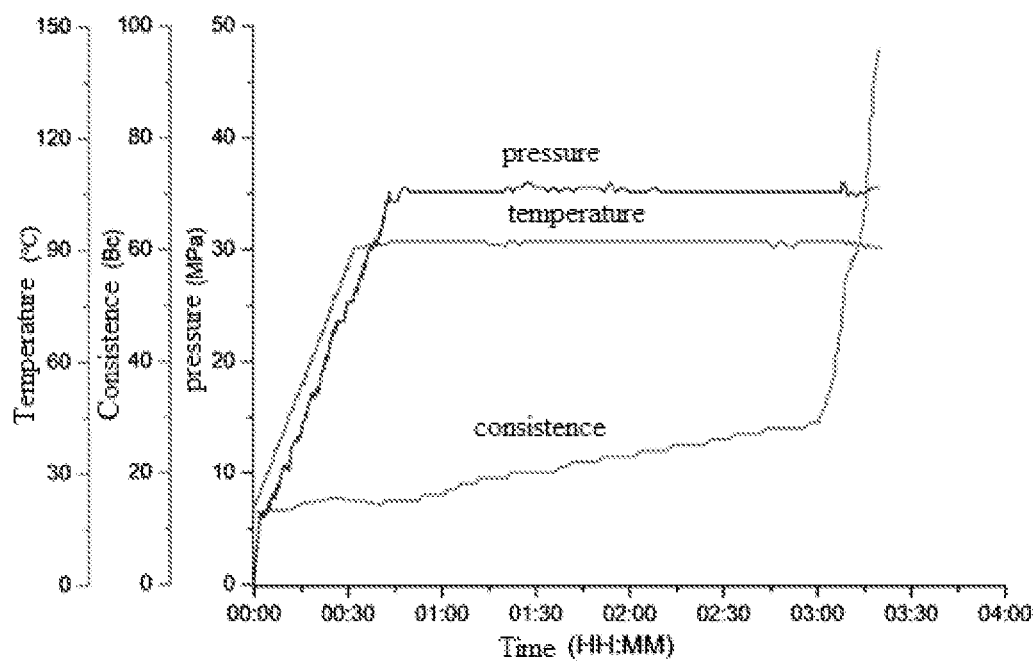
FIG. 1 is a graph showing the densifying curve of retarder at an added amount of 0.5% under the temperature of 90° C. and the pressure of 35 MPa in Example 1 of the present disclosure.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

A first aspect of the present disclosure provides a high-temperature retarder comprising a structural unit a represented by Formula (1), a structural unit B represented by Formula (2), and a structural unit C represented by Formula (3);

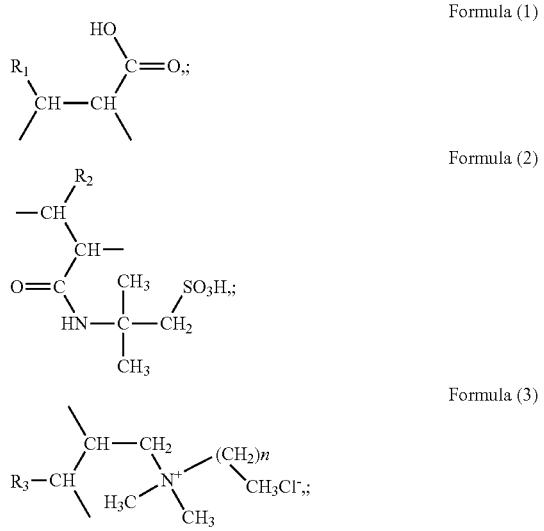

wherein the structural percentages of structural unit A, structural unit B, and structural unit C are x, y, and z, and x=37.2-57.23%, y=40.52-61.4%, z=1.38-4.35%, and the sum of x, y, and z is 1;

wherein $R_1$, $R_2$ and $R_3$ are the same or different, and each is independently H, or a substituted or unsubstituted alkyl of $C_1$-$C_4$;

wherein n is 11, 13, 15, 17, 19 or 21.

According to the present disclosure, preferably $R_1$, $R_2$ and $R_3$ are the same or different, and each is independently H, methyl, ethyl, n-propyl, isopropyl or butyl; more preferably H; n is more preferably 15, 17, 19 or 21. Moreover, in the present disclosure, the high-temperature retarder contains a structural unit A (i.e., an unsaturated acid group containing a carboxylic acid functional group) such that the adsorption capacity of retarder molecular chains to cement particles can be increased, and the cement particles can still be effectively adsorbed when the thermal motion of the retarder molecular chains is intensified in a high-temperature environment; the high-temperature retarder contains a structural unit B (i.e., contains sulfonic acid groups), and can improve the rigidity and steric hindrance of a retarder molecular chain, thereby improving the performances of heat resistance, salt resistance, alkali resistance and the like; the high-temperature retarder contains a structural unit C (i.e., a hydrophobic monomer group with a special configuration), and can be polymerized to form a terpolymer high-temperature retarder which may resist high-temperature and cannot be easily decomposed; wherein the hydrophobic monomer group with special configuration is a quaternary ammonium salt hydrophobic monomer group containing long carbon chain alkyl hydrophobic group, as shown in structural unit C; wherein the hydrophobic monomer is prepared by polymerizing chloropropene and long-chain alkylamine (the number of long chain alkyls is an even number between 14 and 24), and the hydrophobicity of the synthesized monomer is enhanced along with an increased length of the long chain alkyl (the n value increases).

In the present disclosure, when each of $R_1$, $R_2$ and $R_3$ is independently H, the structural unit A is an acrylic acid group, the structural unit B is a 2-acrylamido-2-methylpropanesulfonic acid group, and the structural unit C is a rigid hydrophobic monomer group.

According to the present disclosure, the high-temperature retarder is a light yellow slightly viscous liquid, the weight average molecular weight may be within a range of 50000-190000, preferably 70000-150000, and the mass content of active ingredients is more than or equal to 40%. In the present disclosure, the high temperature retarder is defined to have the structural units represented by the above Formulas (1) to (3) and to have the above-described weight average molecular weight, and it is possible to adjust the densifying time of cement slurry without affecting the settlement stability of cement slurry at high temperatures, and the set cement has high early strength at low temperatures.

According to the present disclosure, the present disclosure provides a preparation method of the aforementioned high-temperature retarder, wherein the method comprises mixing a monomer A, a monomer B, a monomer C and deionized water and subsequently performing a copolymerization reaction in the presence of an initiator;

wherein the monomer A has a structure shown in Formula (1-1), the monomer B has a structure shown in Formula (2-2), and the monomer C has a structure shown in Formula (3-3);

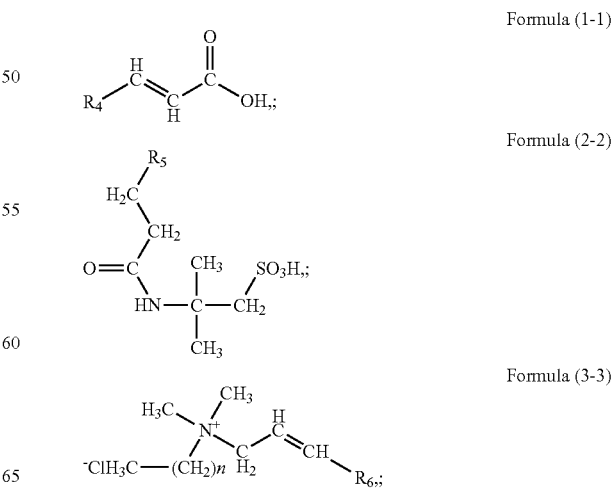

wherein $R_4$, $R_5$ and $R_6$ are the same or different, and each is independently H, or a substituted or unsubstituted alkyl of $C_1$-$C_4$;

wherein n is 11, 13, 15, 17, 19 or 21;

wherein the monomers A, B and C are used in such amounts that the structural percentages of the structural units A, B and C contained in the high temperature retarder are x, y and z, and x=37.2-57.23%, y=40.52-61.4%, z=1.38-4.35%, and the sum of x, y and z is 1.

According to the present disclosure, the weight ratio of the used amount of the monomer A, the monomer B and the monomer C is (2.4-6.3):(6.5-22.77):1; preferably (3.6-4.8):(8.6-20.7):1.

Preferably, $R_4$, $R_5$ and $R_6$ are the same or different, and each is independently H, methyl, ethyl, n-propyl, isopropyl or butyl, more preferably H; n is more preferably 15, 17, 19 or 21; moreover, in the present disclosure, when each of $R_4$, $R_5$, and $R_6$ is independently H, the monomer A is acrylic acid, the monomer B is 2-acrylamido-2-methylpropanesulfonic acid, and the monomer C is the rigid hydrophobic monomer.

According to the present disclosure, acrylic acid is used as one of reaction monomers, so that the adsorption capacity of retarder molecular chains to the cement particles is improved, and the cement particles can still be effectively adsorbed when the thermal motion of the retarder molecular chains is intensified in a high-temperature environment. In the present disclosure, acrylic acid is commercially available, for example, from the Sinopharm Chemical Reagent Co., Ltd., it is chemically pure.

According to the present disclosure, 2-acrylamide-2-methylpropanesulfonic Acid (AMPS) is used as one of reaction monomers, and has the advantages that the intramolecular steric hindrance of the 2-acrylamide-2-methylpropanesulfonic acid ensures that the thermal stability is good, the hydrolysis will not easily occur, and the molecule contains a sulfonate group (—$SO_3$—), such that the molecule is insensitive to the interference of the external acid, alkali and salt ions, the rigidity and steric hindrance of the molecular chain of the retarder are enhanced, thereby improving the performances of heat resistance, salt resistance, alkali resistance and the like. In the present disclosure, 2-acrylamido-2-methylpropanesulfonic Acid (AMPS) is commercially available, for example, from Guangdong Wenjiang Chemical Reagent Co., Ltd., the model number is analytically pure.

According to the present disclosure, the rigid hydrophobic monomer can be synthesized by experimental means.

In the present disclosure, a rigid hydrophobic monomer is developed by increasing the length of an alkyl chain in the monomer, the rigid hydrophobic monomer is a rigid hydrophobic long-chain alkyl monomer and can endow the synthesized polymer with the temperature response characteristic; therefore, the present disclosure utilizes chloropropene and N, N-dimethyl long-chain alkyl tertiary amine (the number of long chain alkyl is an even number of 14-24) to synthesize the rigid hydrophobic long-chain alkyl which comprises the quaternary ammonium salt as the rigid hydrophobic monomer, and the specific synthesis method comprises the following steps:

(1) adding fatty alcohol and a suitable amount of catalyst into a reaction kettle, heating the reaction kettle, introducing monomethylamine into the reaction kettle at the temperature of 130° C. at the flow rate of 35 kg/h-50 kg/h for 75-85 min, and finally keeping the reaction temperature of the reaction kettle to be within a range of 180-200° C. for performing reaction for 5-7 h so as to synthesize the N, N-dimethyl long-chain alkyl tertiary amine (the number of long chain alkyl is an even number within 14-24);

(2) the quaternization of tertiary amines is accomplished by introducing the quaternizing agent ($C_3H_5C_1$) into a closed vessel containing the tertiary amine, a small amount of a base solution ($Na_2CO_3$), and an alcohol solvent (isopropanol) at a reaction temperature of 75-90° C. and a reaction pressure within a range of $3.0\times9.8\times10^4$ Pa to $3.5\times9.8\times10^4$ Pa.

The reaction Formula is as follows:

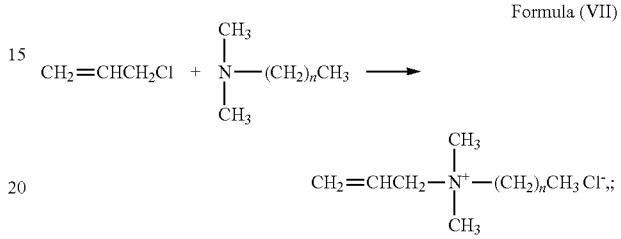

Formula (VII)

wherein the hydrophobicity of the rigid hydrophobic monomer is enhanced with an increased length of the long-chain alkyl chain (n value is increased), the N, N-dimethyl long-chain alkyl tertiary amine with n being 15, 17, 19 or 21 is further preferable to prepare the rigid hydrophobic monomer.

In the present disclosure, both chloropropene and N, N-dimethyl long-chain alkyl tertiary amine are commercially available, for example, chloropropene is commercially available from Jinan Renyuan Chemical Co., Ltd., it is chemically pure; the N, N-dimethyl long-chain alkyl tertiary amine is commercially available from Shanghai Aladdin Biochemical Technology Co., Ltd., it is chemically pure. In the present disclosure, it is preferable that the chloropropene used is industrially pure and is subjected to a purification treatment by distillation before use.

In the present disclosure, the rigid hydrophobic monomer, especially, the N, N-dimethyl long-chain alkyl quaternary ammonium salt with n being 15, 17, 19 or 21 is selected as one of the reaction monomers, and in the present disclosure, by introducing the hydrophobic monomer with a special configuration, retarder molecules are shown as a functional group with retarding capability bound by side chain agglomeration at low temperature, that is, the long-chain alkyl side chains are curled and agglomerated due to hydrophobic association, and the contraction of macromolecular chains causes collapse, thereby inhibiting the extension of retarder molecules in aqueous solution and the adsorption on cement particles; after the temperature rises and reaches a certain temperature point (85° C.), the long-carbon alkyl side chain begins to gradually stretch and open, the hydrophobic association formed by the long-carbon alkyl side chain completely disappears at high temperature (140° C.), and the aggregation structure is opened due to the stretching of a majority of side chains, so the adsorption capacity of retarder molecules on the surface of cement particles at high temperature is significantly increased, the densifying time of cement slurry at high temperature is effectively prolonged, the aim of regulating the form distribution and adsorption state of the retarder in the cement slurry at high temperature and low temperature to regulate the retarding capacity of the retarder is achieved, in the meanwhile, the association bond may be broken and reformed, thus the association process is reversible.

Preferably, the chloropropene is chemically pure and is subjected to a purification treatment by distillation before use.

According to the present disclosure, the hydrophobic monomer shall be dissolved in deionized water in advance at a mass concentration of 10-30%.

Preferably, the hydrophobic monomer is a light yellow wax, the density is 0.62-0.8 g/cm$^3$, and the mass content of the active ingredients is more than or equal to 60%.

According to the present disclosure, preferably, the total amount of the monomer A, the monomer B and the monomer C is 35-40 wt % of the amount of the deionized water;

Preferably, the mixed solution of the monomer A, the monomer B, the monomer C and the deionized water has a pH of 4-6. In the present disclosure, the pH of the reaction solution can be adjusted by using an alkali solution, wherein the alkali solution is a sodium hydroxide solution or a potassium hydroxide solution, and the mass concentration of the alkali solution is 10-30%.

According to the present disclosure, the initiator adopts a redox initiation system, wherein the oxidant is at least one of persulfate, ammonium persulfate and potassium persulfate, the reducer is at least one of sodium bisulfite, ammonium hydroxide and triethylamine, and the molar ratio of the oxidant to the reducer is (2-4):(1-2), preferably 1:(0.3-1).

According to the present disclosure, the initiator is used in an amount of 0.1-1 wt % of the total amount of the monomer A, the monomer B and the monomer C. In the present disclosure, the initiator should be added at a rate sufficiently slow to avoid implosion of the reacting monomers or excessively large molecular weight of the product during the polymerization reaction.

According to the present disclosure, the monomer A, the monomer B and the monomer C (for example, 2-acrylamido-2-methylpropanesulfonic acid, acrylic acid and the rigid hydrophobic monomer) are all dissolved in deionized water, uniformly stirred to form a mixed solution, the pH is adjusted, and then the mixed solution with the adjusted pH may be placed in a reaction device, wherein the reaction device comprises main components such as a ground three-neck flask with a capacity of 500 ml, a precise booster electric stirrer, a constant-pressure dropping funnel and the like, and the three-neck flask is sealed through a latex tube; the oxygen in the three-neck flask is discharged, the three-neck flask is placed in a water bath tank with the temperature of 40-70° C., preferably 50° C., and subjected to stirring by using a precise booster electric stirrer at the rotating speed of 300-600 rpm, dropwise adding the initiator into a mixed solution obtained by mixing 2-acrylamide-2-methylpropanesulfonic acid, acrylic acid, the rigid hydrophobic monomer and the deionized water at the dropping rate of 5-15 ml/min when the temperature of the reaction solution is raised to 40-70° C., preferably 50° C., the viscosity-increasing operation of the reaction system is initiated and the stirring process is stopped after 10 min, standing still for reaction for 4-9 h, preferably 8 h to obtain a light yellow slightly viscous polymer, and subjects to purifying and drying to prepare the high-temperature retarder.

Wherein the oxygen in the reaction vessel may be discharged by filling nitrogen into the reaction vessel.

According to the present disclosure, the method also comprises the step of purifying and drying the reaction product after the copolymerization reaction, wherein acetone is used for purification for 2-3 times.

The drying process may be performed by drying in a constant temperature drying oven, and the drying time is not particularly limited as long as it is dried, for example, the drying time may be 10-12 hours, and preferably 10 hours.

According to the present disclosure, a terpolymer retarder which is suitable for cementing slurry and resistant to high temperature and cannot be easily decomposed is formed by polymerization of a main monomer and the auxiliary monomers, wherein the main monomer is the sulfonic acid-containing group, the auxiliary monomers are an organic acid containing a large amount of carboxylic acid functional groups and a hydrophobic monomer containing a long-chain alkyl. The retarder is in a liquid state at normal temperature, it has certain hydrophilicity, can be quickly and uniformly dissolved in the cement slurry, and will not influence the rheological property of the cement slurry. The retarder has stable molecular structure and contains a sulfonate group, so that the retarder cannot be easily decomposed at high temperature. Secondly, a monomer capable of increasing the adsorption capacity of retarder molecular chains on cement particles is introduced, so that the cement particles can still be effectively adsorbed when the thermal motion of the retarder molecular chains is intensified in a high-temperature environment, thereby ensuring the retarding performance of the retarder under the high-temperature condition is ensured. In addition, the retarder does not influence the settlement stability of cement, can obviously improve the early compression strength of set cement, and improves the comprehensive performance of a cement slurry system.

According to the present disclosure, the present disclosure provides a cementing slurry, wherein the cementing slurry comprises a high-temperature retarder, and the dosage of the high-temperature retarder is 0.2-2 wt % based on the total weight of the cementing slurry;

wherein the high-temperature retarder contains a structural unit A shown in Formula (1), a structural unit B shown in Formula (2) and a structural unit C shown in Formula (3);

Formula (1)

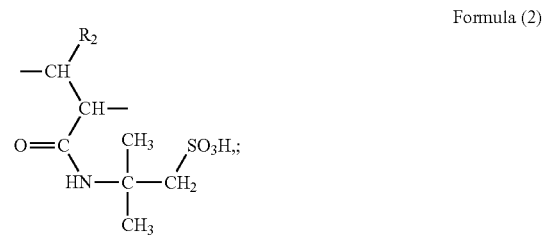

Formula (2)

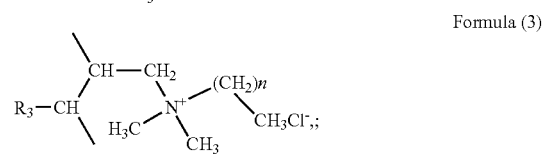

Formula (3)

wherein the structural percentages of structural unit A, structural unit B, and structural unit C are x, y, and z, and x=37.2-57.23%, y=40.52-61.4%, z=1.38-4.35%, and the sum of x, y, and z is 1;

wherein $R_1$, $R_2$ and $R_3$ are the same or different, and each is independently H or a substituted or unsubstituted alkyl of $C_1$-$C_4$;

wherein n is 11, 13, 15, 17, 19 or 21.

In the present disclosure, the formulation of the cementing slurry is not specifically defined, and can be selected by those skilled in the art, for example, the specific mass parts of the components used in the cement slurry system for well cementation are as follows:

Formulation 1#: 100 parts of Shengwei G-level cement from Shandong Lintong Shengwei Special Cement Co., Ltd., 0.2-2 parts of high-temperature retarder, 2 parts of defoaming agent and 42 parts of water;

Formulation 2#: 100 parts of Shengwei G-level cement from Shandong Lintong Shengwei Special Cement Co., Ltd., 40 parts of silica powder, 0.2-2 parts of the high-temperature retarder, 2 parts of the defoaming agent and 36 parts of water.

The second aspect of the present disclosure provides a high-temperature retarder comprising a structural unit E shown in Formula (5), a structural unit B shown in Formula (2), a structural unit C shown in Formula (3) and a structural unit D shown in Formula (4);

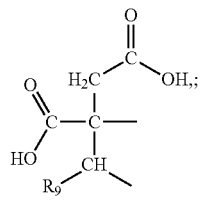

Formula (5)

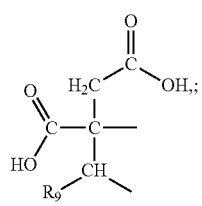

Formula (2)

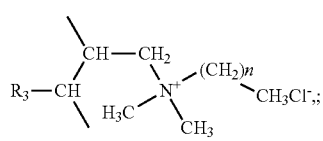

Formula (3)

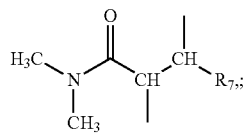

Formula (4)

wherein the structural percentages of structural units E, B, C and D are q, m, n and p, and p=7.18-10.76%, q=40.22-64.66%, m=25.86-46.25%, n=1.05-3.8%, and the sum of p, q, m, n is 1;

wherein $R_9$, $R_2$, $R_3$ and $R_7$ are the same or different, and each is independently H or a substituted or unsubstituted alkyl of $C_1$-$C_4$;

wherein n is 11, 13, 15, 17, 19 or 21.

According to the present disclosure, preferably $R_9$, $R_2$, $R_3$ and $R_7$ are identical or different, each is independently H, methyl, ethyl, n-propyl, isopropyl or butyl, more preferably H; n is 15, 17, 19 or 21. Moreover, in the present disclosure, the high-temperature retarder contains a structural unit E (i.e., unsaturated acid groups containing carboxyl functional groups) so that the adsorption capacity of retarder molecular chains to cement particles can be increased, and the cement particles can still be effectively adsorbed when the thermal motion of the retarder molecular chains is intensified in a high-temperature environment; the high-temperature retarder contains a structural unit B and a structural unit D (i.e., containing a sulfonic acid group and an amide group), can improve the rigidity and steric hindrance of a molecular chain of the retarder, thereby improving the performances of heat resistance, salt resistance, alkali resistance and the like; the high-temperature retarder contains a structural unit C (i.e., a hydrophobic monomer group with a special configuration) can be polymerized to form a quadripolymer high-temperature retarder which may resist high-temperature and cannot be easily decomposed; wherein the hydrophobic monomer group with special configuration is a quaternary ammonium salt hydrophobic monomer group containing long carbon chain alkyl hydrophobic group, as shown in structural unit C; wherein the hydrophobic monomer is prepared by polymerizing chloropropene and long-chain alkylamine (the number of long chain alkyls is an even number between 14 and 24), and the hydrophobicity of the synthesized monomer is enhanced along with an increased length of the long chain alkyl (the n value increases).

In the present disclosure, when each of $R_9$, $R_2$, $R_3$ and $R_7$ is independently H, the structural unit E is an itaconic acid group, so that the unit B is a 2-acrylamido-2-methylpropanesulfonic acid group, the structural unit C is a rigid hydrophobic monomer group, and the structural unit D is an N, N-dimethylacrylamide group.

According to the present disclosure, the high-temperature retarder is a light white slightly viscous liquid, the weight average molecular weight may be within a range of 90000-210000, preferably 110000-170000, and the mass content of active ingredients is more than or equal to 40%. In the present disclosure, the high-temperature retarder is defined as having the structural unit shown above and the weight average molecular weight mentioned above, so that the aims of "no retardation at low temperature and retardation at high temperature" of cement slurry can be achieved, that is, the retardation capability of the retarder under different temperature conditions is adjusted by regulating and controlling the morphological distribution and adsorption state of the retarder in the cement slurry.

According to the present disclosure, the present disclosure provides a preparation method of a high-temperature retarder, wherein the method comprises mixing a monomer E, a monomer B, a monomer C, a monomer D and deionized water and subsequently performing a copolymerization reaction in the presence of an initiator;

wherein the monomer E has a structure shown in Formula (5-5), the monomer B has a structure shown in Formula (2-2), the monomer C has a structure shown in Formula (3-3), and the monomer D has a structure shown in Formula (4-4);

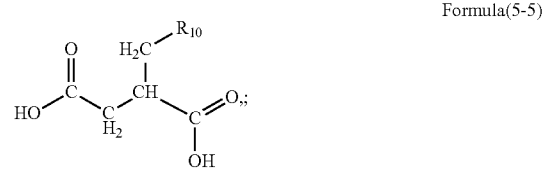

Formula(5-5)

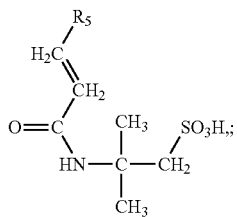

Formula (2-2)

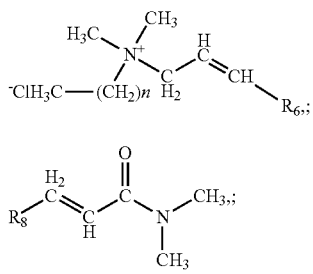

Formula (3-3)

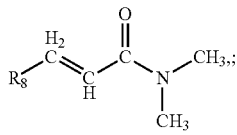

Formula (4-4)

wherein $R_{10}$, $R_5$, $R_6$ and $R_8$ are the same or different, and each is independently H or a substituted or unsubstituted alkyl of $C_1$-$C_4$;

wherein n is 11, 13, 15, 17, 19 or 21;

wherein the monomers E, B, C and D are used in such amounts that the structural percentages of said structural unit E, said structural unit B, said structural unit C and said structural unit D contained in the high temperature retarder are q, m, n and p, and p=7.18-10.76%, q=40.22-64.66%, m=25.86-46.25%, n=1.05-3.8%, and the sum of p, q, m and n is 1.

According to the present disclosure, the weight ratio of the used amounts of the monomer E, the monomer B, the monomer C and the monomer D is (5.25-11.82):(7.53-9.56):(0.40-1.61): 1; preferably (6.57-10.51):(8.36-9.2):(0.8-1.21): 1.

Preferably, $R_{10}$, $R_5$, $R_6$ and $R_8$ are the same or different, and each is independently H, methyl, ethyl, n-propyl, isopropyl or butyl, more preferably H; n is more preferably 15, 17, 19 or 21. In addition, in the present disclosure, when each of $R_{10}$, $R_5$, $R_6$ and $R_8$ is independently H, the monomer E is itaconic acid, the monomer B is 2-acrylamido-2-methylpropanesulfonic acid, the monomer C is the rigid hydrophobic monomer, and the monomer D is N, N-dimethylacrylamide.

According to the present disclosure, itaconic acid is used as one of reaction monomers, so that the adsorption capacity of retarder molecular chains to cement particles is improved, and the cement particles can be effectively adsorbed when the thermal motion of the retarder molecular chains is intensified in a high-temperature environment. In the present disclosure, itaconic acid is commercially available, for example, from the Sinopharm Chemical Reagent Co., Ltd., it is chemically pure.

According to the present disclosure, 2-acrylamide-2-methylpropanesulfonic Acid (AMPS) is used as one of reaction monomers, and has the advantages that the intramolecular steric hindrance of the 2-acrylamide-2-methylpropanesulfonic acid ensures that the thermal stability is good, the hydrolysis will not easily occur, and the molecule contains a sulfonate group (—$SO_3$—), such that the molecule is insensitive to the interference of the external acid, alkali and salt ions, the rigidity and steric hindrance of the molecular chain of the retarder are enhanced, thereby improving the performances of heat resistance, salt resistance, alkali resistance and the like. In the present disclosure, 2-acrylamido-2-methylpropanesulfonic Acid (AMPS) is commercially available, for example, from Guangdong Wenjiang Chemical Reagent Co., Ltd., the model number is analytically pure.

According to the present disclosure, the rigid hydrophobic monomer can be synthesized by experimental means, as described above, the synthetic process will not be repeated herein.

According to the present disclosure, N, N-dimethylacrylamide is used as one of the reaction monomers, and the compound has the advantages that the monomer includes double bond and amide group, and a super-conjugated system is formed among nitrogen, carbonyl and double bond under the promotion of two methyl groups connected with nitrogen atoms, the thermal stability is excellent. In the present disclosure, N, N-dimethylacrylamide is commercially available, for example, from Alladin reagent (Shanghai) Co., Ltd. with the model number of GC grade and being chromatographically pure.

According to the present disclosure, preferably, the total amount of the monomer A, the monomer B and the monomer C is 30-50 wt % of the amount of the deionized water;

Preferably, the mixed solution of the monomer E, the monomer B, the monomer C, the monomer D and the deionized water has a pH of 4-6. In the present disclosure, the pH of the reaction solution can be adjusted by using an alkali solution, wherein the alkali solution is a sodium hydroxide solution or a potassium hydroxide solution, and the mass concentration of the alkali solution is 10-30%.

According to the present disclosure, the initiator adopts a redox initiation system, wherein the oxidant is at least one of persulfate, ammonium persulfate and potassium persulfate, the reducer is at least one of sodium bisulfite, ammonium hydroxide and triethylamine, and the molar ratio of the oxidant to the reducer is (2-4):(1-2), preferably 1:(0.5-1).

According to the present disclosure, the initiator is used in an amount of 0.1-1 wt %, based on the total amount of the monomer E, the monomer B, the monomer C and the monomer D. In the present disclosure, the initiator should be added at a rate sufficiently slow to avoid implosion of the reacting monomers or excessive molecular weight of the product during the polymerization reaction.

According to the present disclosure, the monomer E, the monomer B, the monomer C and the monomer D (for example, 2-acrylamido-2-methylpropanesulfonic acid, acrylic acid, the rigid hydrophobic monomer and N, N-dimethylacrylamide) are all dissolved in deionized water, uniformly stirred to form a mixed solution, the pH is adjusted, and then the mixed solution with the adjusted pH may be placed in a reaction device, wherein the reaction device comprises main components such as a ground three-neck flask with a capacity of 500 ml, a precise booster electric stirrer, a constant-pressure dropping funnel and the like, and the three-neck flask is sealed through a latex tube; the oxygen in the three-neck flask is discharged, the three-neck flask is placed in a water bath tank with the temperature of 40-70° C., preferably 50° C., and subjected to stirring by using a stirrer at the rotating speed of 300-600 rpm, dropwise adding the initiator into a mixed solution obtained by mixing 2-acrylamide-2-methylpropanesulfonic acid, acrylic acid, the rigid hydrophobic monomer and the deionized water at the dropping rate of 5-15 ml/min when the temperature of the reaction solution is raised to 40-70° C., preferably 50° C., viscosity-increasing operation of the reaction system is initiated and the stirring process is stopped after 10 min, standing still for reaction for 10-12 h, preferably 10 h to obtain a milky polymer, and subjects to purifying and drying to prepare the high-temperature retarder.

Wherein the oxygen in the reaction vessel may be discharged by filling nitrogen into the reaction vessel.

According to the present disclosure, the method further comprises the step of purifying and drying the reaction product after the copolymerization reaction, wherein acetone is used for purification for 3-6 times.

The drying process may be performed by drying in a constant temperature drying oven, and the drying time is not particularly limited as long as it is dried, for example, the drying time 10-12 hours, and preferably 10 hours.

According to the present disclosure, a quadripolymer retarder which is suitable for cementing slurry and resistant to high temperature and cannot be easily decomposed is formed by polymerization of a main monomer and the auxiliary monomers, wherein the main monomer is the sulfonic acid-containing group, the auxiliary monomers are an organic acid containing a large amount of carboxylic acid functional groups, an monomer containing amide group, and a hydrophobic monomer containing a long-chain alkyl. The retarder has stable molecular structure and contains a sulfonate group and an amide group, so that the retarder cannot be easily decomposed at high temperature. Secondly, a monomer capable of increasing the adsorption capacity of retarder molecular chains on cement particles is introduced, so that the cement particles can still be effectively adsorbed when the thermal motion of the retarder molecular chains is intensified in a high-temperature environment, thereby ensuring the retarding performance of the retarder under the high-temperature condition. Finally, a quaternary ammonium salt hydrophobic monomer containing a long carbon chain alkyl hydrophobic group is introduced, and a series of optimization experiments is performed to ensure that the retarder has the temperature-adaptive characteristic.

The third aspect of the present disclosure provides a cementing slurry, wherein the cementing slurry comprising a high temperature retarder, and the dosage of the high temperature retarder is 0.2-2 wt % based on the total weight of the cementing slurry;

wherein the high-temperature retarder contains a structural unit E shown in Formula (5), a structural unit B shown in Formula (2), a structural unit C shown in Formula (3) and a structural unit D shown in Formula (4);

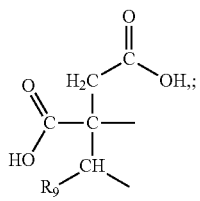

Formula (5)

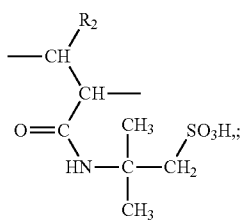

Formula (2)

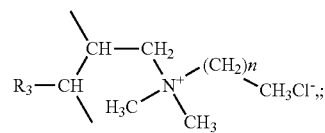

Formula (3)

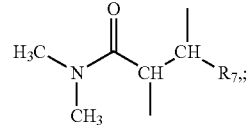

Formula (4)

wherein the structural percentages of structural unit E, structural unit B, structural unit C and structural unit D are q, m, n and p, and p=7.18-10.76%, q=40.22-64.66%, m=25.86-46.25%, n=1.05-3.8%, and the sum of p, q, m, n is 1;

wherein $R_9$, $R_2$, $R_3$ and $R_7$ are the same or different, and each is independently H or a substituted or unsubstituted alkyl of $C_1$-$C_4$;

wherein n is 11, 13, 15, 17, 19 or 21.

In the present disclosure, the formulation of the cementing slurry is not specifically defined, and can be selected by those skilled in the art, for example, the specific mass parts of the components of the used cement slurry system for well cementation are as follows:

Formulation 1#: 100 parts of Shengwei G-level cement from Shandong Lintong Shengwei Special Cement Co., Ltd., 0.2-2 parts of high-temperature retarder, 2 parts of defoaming agent and 42 parts of water;

Formulation 2#: 100 parts of Shengwei G-level cement from Shandong Lintong Shengwei Special Cement Co., Ltd., 40 parts of silica powder, 0.2-2 parts of the high-temperature retarder, 2 parts of the defoaming agent and 36 parts of water.

According to the present disclosure, the present disclosure provides an application of the aforementioned high-temperature retarder. or the high-temperature retarder prepared with the aforementioned method, or the cementing slurry in the field of oil and gas well cementation engineering.

Preferably, the well cementation may be performed on one or more of deep well, highly deviated well and horizontal well.

Due to the technical solution, the present disclosure has the following advantages:

(1) A high-temperature retarder with temperature-adaptive characteristic is prepared by adopting a free radical aqueous solution polymerization mode and using an inorganic peroxide as an initiator. The raw materials have wide and easily obtained sources, the cost is low, the requirements on preparation conditions are low, the preparation method is simple and convenient, the polymer may be synthesized with high success rate and high conversion rate, thus the high-temperature retarder is very suitable for large-scale production and application.

(2) Functional group monomers with special configuration and difficult degradation, such as sulfonic acid groups, carboxylic acid groups, amide groups and the like are introduced, such that the temperature resistance of the obtained polymer is significantly improved, and the densifying time of cement slurry can be effectively prolonged.

(3) The retarder is modified by utilizing a quaternary ammonium salt monomer containing long carbon chain alkyl hydrophobic groups, a hydrophobic group side chain is introduced on a hydrophilic long chain, and the retarding capability of the retarder under different temperature conditions is adjusted by regulating the morphological distribution and adsorption state of the retarder in cement slurry, so that the retarder has temperature adaptability. Under a low temperature, side chain groups of the long carbon chain alkyl shrink and curl due to the hydrophobic effect, the side chain groups are mutually wound and agglomerated, tightly wrap and cover a majority of the retarding groups, hamper the retarding groups from extending in an aqueous solution, and effectively prevent the retarding groups from being adsorbed on the surfaces of cement particles, thereby weakening the retarding effect of the retarder on cement hydration, having less influence on the low-temperature hydration capability of cement, so that the cement strength still develops rapidly at low temperature, and the set cement has desirable compression strength performance; along with the rise of temperature, the retarder molecules continuously stretch out and disperse in an aqueous solution and are partially adsorbed on the surfaces of cement particles, so that a stronger and stronger retarding effect is shown, and the densifying time of cement slurry is effectively prolonged; under a moderate temperatures, most of the retarding groups are tightly wrapped and covered by the side chains of the coiled long carbon chain alkyl, and a small part of the retarding groups are stretched due to the opening of the agglomerated structure, so that the retarding effect is slightly increased. Under a high temperature, the hydrophobic association effect of the side chain of the long carbon chain alkyl disappears, the functional group with the retarding effect is completely released, the retarding functional group and the long carbon chain alkyl in the retarder molecule are completely extended, dispersed and fully adsorbed on the surface of cement particles in the aqueous solution, and the shown high-temperature retarding effect is very strong, thus the high-temperature densifying time of cement slurry is effectively controlled. Meanwhile, the substitution degree of hydrophobic groups in the retarder is controlled by altering the added amount of the hydrophobic monomer, the temperature-adaptive characteristic of the retarder can be adjusted.

(4) The retarder in the present disclosure has temperature adaptability, can effectively solve the problem that the exiting oil well cement retarder has low early strength at low temperature, the performance of the retarder molecules under low temperature is that the side chain agglomerates and bounds the functional groups having the retarding effect, the retarding capability of the retarder is strengthened along with the rise of temperature, the performance of the retarder molecules under high temperature is that the side chain opens and releases the functional groups having a retarding effect, so that the aims of "no retardation at low temperature and retardation at high temperature" of cement slurry can be achieved, the comprehensive performance of cement slurry can be effectively improved, and the safety of well cementation construction and the well cementation quality are guaranteed.

(5) The high-temperature retarder of the present disclosure may effectively prolong the densifying time of cement slurry under high temperature, increase the early strength of set cement under low temperature; in addition, it can effectively weaken the side effects of over-dispersion and the like of the retarder by controlling the functional groups with the retarding effect to be gradually released along with the temperature rise, thereby facilitating the settlement stability of the cement slurry and improving the comprehensive performance of the cement slurry system.

The present disclosure will be described in detail below with reference to the examples.

Experimental methods used in the examples: the cement slurry system is prepared according to the national standard GB/T19139-2003 "oil well cement test method" of China, in addition, the performances of the cement slurry system and the added components are tested by referring to the enterprise standard SY/T6544-2003 "oil well cement slurry performance requirement", the enterprise SY/T6466-2000 "oil well set cement high temperature resistance performance evaluation method", and the enterprise standard SY/T5504.1-2013 "oil well cement admixture evaluation method".

The "parts" described in the Examples and Test Examples are "parts by mass".

The raw materials used in the Examples are exiting and commercially available products.

Example 1

The example illustrated a high temperature retarder prepared with the method of the present disclosure.

The preparation steps were as follows:

(1) 51.75 parts of 2-acrylamide-2-methylpropanesulfonic acid (monomer B), 21.6 parts of acrylic acid (monomer A) and 6 parts of hydrophobic monomer (monomer C) were weighted and dissolved in deionized water respectively, wherein the total mass concentration of the monomers in the solution was 25%, a sodium hydroxide solution with the concentration of 5 mol/L was used for adjusting pH of said solution to 6;

wherein the rigid hydrophobic monomer had a structure represented by Formula (3-3), and $R_6$ was H, n was 21;

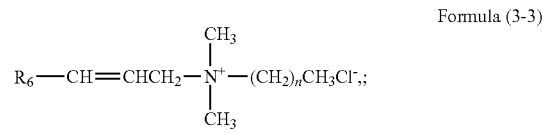

Formula (3-3)

(2) the temperature of the water bath box was adjusted to 55° C., and the reaction device was installed. The mixed solution of 2-acrylamide-2-methylpropanesulfonic acid, acrylic acid and hydrophobic monomer was transferred into a three-neck flask, and stirred with a magnetic stirrer, the rotating speed was kept at 500 rpm, nitrogen was introduced into the container to discharge oxygen. 2.5 parts of ammonium persulfate and 2 parts of sodium bisulfite were respectively weighed to prepare a solution, the mass concentration of the initiator in the solution was 1.8%, when the temperature was raised to 55° C., the initiator was added into a three-neck flask by using a constant pressure dropping funnel, the added amount of the initiator was 0.4% of the total mass of the monomers.

(3) After the dropwise addition was implemented, the rotation speed was kept unchanged, the reaction was performed at a set temperature for 8 hours, the faint yellow slightly viscous liquid was cooled to room temperature and purified by using acetone for 3 times to prepare the high-temperature retarder for well cementation, wherein the high-temperature retarder was marked as S1.

Wherein the high temperature retarder S1 had a structure:

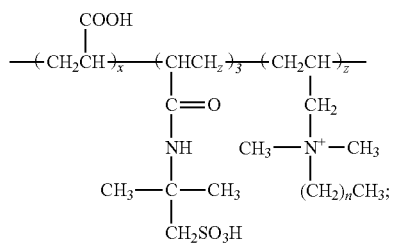

Wherein x=53.19%, y=44.33%, z=2.48%; and
the weight average molecular weight of the high temperature retarder S1 was 70000.

Example 2

The example illustrated a high temperature retarder prepared with the method of the present disclosure.

A high temperature retarder was prepared with the same method as in Example 1, except that the 2-acrylamide-2-methylpropanesulfonic acid (monomer B), acrylic acid (monomer A) and a hydrophobic monomer (monomer C) were weighted according to the weight ratio.

The prepared high temperature retarder was marked as S2.
Wherein the high temperature retarder S2 had a structure as follows:
$[CH_2CM_1H]_x\text{—}[CM_2HCH_2]_y\text{—}[CH_2CM_3HCl\text{-}]_z$;
wherein $M_1$ was —COOH, $M_2$ was —CONHC($CH_3)_2 CH_2SO_3H$, $M_3$ was —[$NCH_2(CH_3)_2(CH_2)$ n$CH_3]^+$;
wherein x=39.45%, y=59.17%, z=1.38%; and
the weight average molecular weight of the high temperature retarder S2 was 150000.

Example 3

The example illustrated a high temperature retarder prepared with the method of the present disclosure.

A high temperature retarder was prepared with the same method as in Example 1, except that 2-acrylamide-2-methylpropanesulfonic acid (monomer B), acrylic acid (monomer A) and a hydrophobic monomer (monomer C) were weighted according to the weight ratio.

The prepared high temperature retarder was marked as S3.
Wherein the high temperature retarder S3 had a structure as follows:
$[CH_2CM_1H]_x\text{—}[CM_2HCH_2]_y\text{—}[CH_2CM_3HCl\text{-}]_z$;
wherein $M_1$ was —COOH, $M_2$ was —CONHC($CH_3)_2 CH_2SO_3H$, $M_3$ was —[$NCH_2(CH_3)_2(CH_2)$ n$CH_3]^+$;
wherein x=43.54%, y=54.43%, z=2.03%; and
the weight average molecular weight of the high temperature retarder S3 was 100000.

Example 4

The example illustrated a high temperature retarder prepared with the method of the present disclosure.

A high temperature retarder was prepared in the same method as in Example 1, except that the 2-acrylamide-2-methylpropanesulfonic acid (monomer B), acrylic acid (monomer A) and a hydrophobic monomer (monomer C) were weighted according to the weight ratio; and n was 11.
The prepared high temperature retarder was marked as S4.

Wherein the high temperature retarder S4 had a structure as follows:
$[CH_2CM_1H]_x\text{—}[CM_2HCH_2]_y\text{—}[CH_2CM_3HCl\text{-}]_z$;
wherein $M_1$ was —COOH, $M_2$ was —CONHC($CH_3)_2 CH_2SO_3H$, $M_3$ was —[$NCH_2(CH_3)_2(CH_2)$ n$CH_3]^+$;
wherein x=52.54%, y=43.78%, z=3.68%; and
the weight average molecular weight of the high temperature retarder S4 was 100000.

Example 5

The example illustrated a high temperature retarder prepared with the method of the present disclosure.

A high temperature retarder was prepared with the same method as in Example 1, except that the rigid hydrophobic monomer had a structure represented by Formula (3-3), however, $R_6$ was H and n was 15.

The prepared high temperature retarder was marked as S5.
Wherein the high temperature retarder S5 had a structure as follows:
$[CH_2CM_1H]_x\text{—}[CM_2HCH_2]_y\text{—}[CH_2CM_3HCl\text{-}]_z$;
wherein $M_1$ was —COOH, $M_2$ was —CONHC($CH_3)_2 CH_2SO_3H$, $M_3$ was —[$NCH_2(CH_3)_2(CH_2)$ n$CH_3]^+$;
wherein x=57.23%, y=40.88%, z=1.89%; and
the weight average molecular weight of the high temperature retarder S5 was 60000.

Example 6

The example illustrated a high temperature retarder prepared with the method of the present disclosure.

A high temperature retarder was prepared with the same method as in Example 1, except that the rigid hydrophobic monomer had a structure represented by Formula (3-3), however, $R_6$ was H and n was 17.

The prepared high temperature retarder was marked as S6.
Wherein the high temperature retarder S6 had a structure as follows:
$[CH_2CM_1H]_x\text{—}[CM_2HCH_2]_y\text{—}[CH_2CM_3HCl\text{-}]_z$;
wherein $M_1$ was —COOH, $M_2$ was —CONHC($CH_3)_2 CH_2SO_3H$, $M_3$ was —[$NCH_2(CH_3)_2(CH_2)$ n$CH_3]^+$;
wherein x=55.37%, y=41.95%, z=2.68%; and
the weight average molecular weight of the high temperature retarder S6 was 50000.

Example 7

The example illustrated a high temperature retarder prepared with the method of the present disclosure.

A high temperature retarder was prepared with the same method as in Example 1, except that the rigid hydrophobic monomer had a structure represented by Formula (3-3), in addition, $R_6$ was H and n was 19.

The prepared high temperature retarder was marked as S7.
Wherein the high temperature retarder S7 had a structure as follows:
$[CH_2CM_1H]_x\text{—}[CM_2HCH_2]_y\text{—}[CH_2CM_3HCl\text{-}]_z$;
wherein $M_1$ was —COOH, $M_2$ was —CONHC($CH_3)_2 CH_2SO_3H$, $M_3$ was —[$NCH_2(CH_3)_2(CH_2)$ n$CH_3]^+$;
wherein x=37.21%, y=61.40%, z=1.39%; and
the weight average molecular weight of the high temperature retarder S7 was 170000.

Example 8

The example illustrated a high temperature retarder prepared with the method of the present disclosure.

A high temperature retarder was prepared with the same method as in Example 1, except that the rigid hydrophobic monomer had a structure represented by Formula (3-3), in addition, $R_6$ was H and n was 13.

The prepared high temperature retarder was marked as S8.

Wherein the high temperature retarder S8 had a structure as follows:

$[CH_2CM_1H]_x$—$[CM_2HCH_2]_y$—$[CH_2CM_3HCl-]_z$;

wherein $M_1$ was —COOH, $M_2$ was —CONHC(CH$_3$)$_2$CH$_2$SO$_3$H, $M_3$ was —[NCH$_2$(CH$_3$)$_2$(CH$_2$)$_n$CH$_3$]$^+$;

wherein x=52.17%, y=43.48%, z=4.35%; and the weight average molecular weight of the high temperature retarder S8 was 170000.

Comparative Example 1

A high temperature retarder was prepared in the same method as in Example 1, except that the on-site high-temperature retarder sample provided by the Engineering Institute of Northwest Oil Field Division of the China Petroleum & Chemical Corporation (Sinopec) was used as the high-temperature retarder. The prepared high temperature retarder was marked as DS1.

Comparative Example 2

A high temperature retarder was prepared in the same method as in Example 1, except that the weight ratio of the used amounts of 2-acrylamide-2-methylpropanesulfonic acid, the acrylic acid and the rigid hydrophobic monomer was 7.2:2.59:1.

The prepared high temperature retarder was marked as DS2.

Comparative Example 3

A high temperature retarder was prepared in the same method as in Example 1, except that the used amounts of 2-acrylamido-2-methylpropanesulfonic acid, the acrylic acid and the rigid hydrophobic monomer caused that the prepared high-temperature retarder containing the following structure:

$[CH_2CM_1H]_x$—$[CM_2HCH_2]_y$—$[CH_2CM_3HCl-]_z$;

wherein $M_1$ was —COOH, $M_2$ was —CONHC(CH$_3$)$_2$CH$_2$SO$_3$H, $M_3$ was —[NCH$_2$(CH$_3$)$_2$(CH$_2$)$_n$CH$_3$]$^+$;

wherein x=23.64%, y=70.92%, z=5.44%.

The prepared high temperature retarder was marked as DS3.

Comparative Example 4

A high temperature retarder was prepared in the same method as in Example 1, except that the used amount of 2-acrylamido-2-methylpropanesulfonic acid, acrylic acid and the rigid hydrophobic monomer caused that the weight average molecular weight of the prepared high temperature retarder was 340000.

The prepared high temperature retarder was marked as DS4.

Test Example 1

The cement slurry was prepared according to the Formulation 1 #, the high-temperature retarder with the mass fraction of 0.5% and described in the Example 1 was added into a cement slurry system for well cementation, a densifying experiment was carried out under the conditions of a temperature of 90° C. and a pressure of 35 MPa, and the experiment result was shown in FIG. 1.

Figure 2:
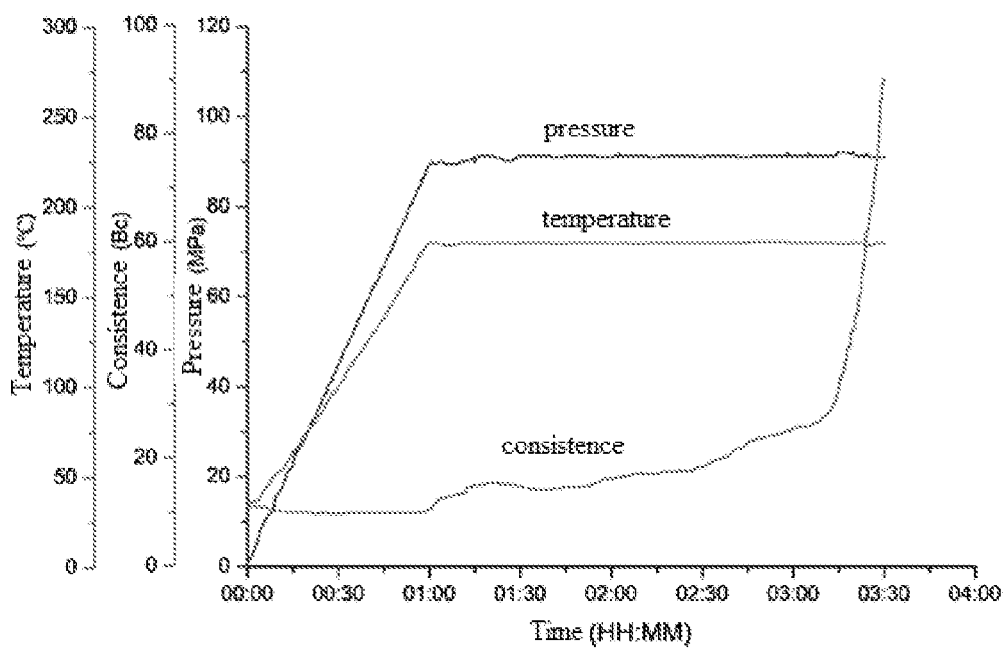
FIG. 2 is a graph showing the densifying curve of retarder at an added amount of 0.5% under the temperature of 180° C. and the pressure of 90 MPa in Example 1 of the present disclosure.

The cement slurry was prepared according to the Formulation 2 #, the high-temperature retarder with the mass fraction of 0.5% and described in the Example 1 was added into a cement slurry system for well cementation, a densifying experiment was carried out under the conditions of a temperature of 180° C. and a pressure of 90 MPa, and the experiment result was shown in FIG. 2.

As can be seen from the results shown in FIG. 1 and FIG. 2, the densifying curve of the cement slurry at different temperatures was stable, there was not abnormal phenomena such as "bulging" and so forth, which indicated that the high-temperature stability of the slurry was excellent, and the transition time period of the densifying curve basically presented a right-angle densifying, which was beneficial to preventing water channeling of the annular and hollow oil & gas, can meet the well cementation construction requirements of high-temperature deep wells, ultra-deep wells and the like, and ensure the well cementation quality.

The high-temperature retarder sample S1 described in Example 1 and the on-site high-temperature retarder sample DS1 prepared in Comparative Example 1 having a mass fraction of 0%, 0.2%, 0.5%, 0.7% and 1.0% were added into the cementing slurry prepared with the Formulation 1 # and the cementing slurry prepared with the Formulation 2 # respectively, and experiments were performed under the densifying condition of the temperature 50-180° C. to test the densifying time of the cement slurry; the results were shown in Table 1.

TABLE 1

| Formulation | Added amount of retarder/% | Temperature/ ° C. | Pressure/ MPa | S1 prepared from Example 1 | | DS1 prepared from Comparative Example 1 | |
|---|---|---|---|---|---|---|---|
| | | | | Initial consistency/ Bc | Densifying time/min | Initial consistency/ Bc | Densifying time/min |
| 1# | 0 | 50 | 0.1 | 15 | 188 | 15 | 188 |
| | 0.2 | | 0.1 | 16 | 211 | 8 | 334 |
| | 0.5 | | 0.1 | 15 | 346 | 7 | 412 |
| 1# | 0.5 | 90 | 35 | 14 | 200 | 7 | 232 |
| | 0.7 | | | 14 | 244 | 6 | 262 |
| 2# | 0.5 | 120 | 60 | 14 | 220 | 5 | 211 |
| | 0.7 | | | 13 | 265 | 5 | 243 |
| | 1.0 | | | 13 | 312 | 4 | 324 |
| 2# | 0.5 | 150 | 80 | 10 | 256 | 5 | 162 |
| | 0.7 | | | 9 | 287 | 4 | 211 |
| | 1.0 | | | 9 | 342 | 4 | 249 |

TABLE 1-continued

| Formu-lation | Added amount of retarder/% | Temperature/ °C. | Pressure/ MPa | S1 prepared from Example 1 | | DS1 prepared from Comparative Example 1 | |
|---|---|---|---|---|---|---|---|
| | | | | Initial consistency/ Bc | Densifying time/min | Initial consistency/ Bc | Densifying time/min |
| 2# | 0.5 | 180 | 90 | 9 | 220 | 5 | 152 |
| | 0.7 | | | 9 | 267 | 3 | 188 |
| | 1.0 | | | 8 | 282 | 3 | 202 |

It was indicated from the experimental results of Table 1 that:

(1) the high-temperature retarder prepared in the Example 1 of the present disclosure had desirable retarding performance on oil well cement under the temperature condition of 50-180° C., and exhibited the excellent temperature resistance, can effectively prolong the densifying time of cement slurry and meet the cementing requirements on the cement slurry at different temperatures.

(2) When the temperature was the same, the densifying time of the cement slurry was prolonged along with an increase of the added amount of the retarder.

(3) Under low temperature (below 90° C.), the retarding group which was not wrapped by the side chain mainly played a role in retarding the hydration of cement, a small amount of the retarding group was released, thus the densifying time was slightly reduced along with the temperature rise. For example, when the added amount was 0.5%, the densifying time of the high-temperature retarder sample S1 was 346 min at the temperature of 50° C., the densifying time of the high-temperature retarder sample S1 was 200 min at 90° C.

(4) When the temperature was higher than 90° C., the retarding group wrapped and covered by the long carbon chain alkyl side chain due to the hydrophobic effect started to gradually spread, when the added amount of the retarder was the same, the densifying time of the cement slurry was slightly prolonged along with the temperature rise.

(5) When the temperature was higher than 140° C., the hydrophobic association effect of the long carbon alkyl side chain disappeared, the functional group with the retardation effect was completely released, and then the densifying time of the cement slurry was shortened along with the temperature rise.

(6) The on-site high-temperature retarder sample DS1 prepared in Comparative Example 1 had a gradually reduced retarding effect along with the temperature rise, and it did not exhibit the temperature-adaptive characteristic.

TABLE 2

| | | Temperature/ °C. 120 | Pressure/ MPa 60 | Temperature/ °C. 150 | Pressure/ MPa 80 | Temperature/ °C. 180 | Pressure/ MPa 90 |
|---|---|---|---|---|---|---|---|
| S2 | Initial consistency/Bc | 14 | | 11 | | 8 | |
| | Densifying time/min | 266 | | 281 | | 275 | |
| S3 | Initial consistency/Bc | 15 | | 10 | | 7 | |
| | Densifying time/min | 261 | | 274 | | 262 | |
| S4 | Initial consistency/Bc | 13 | | 9 | | 6 | |
| | Densifying time/min | 249 | | 265 | | 249 | |
| S5 | Initial consistency/Bc | 13 | | 8 | | 5 | |
| | Densifying time/min | 251 | | 266 | | 241 | |
| S6 | Initial consistency/Bc | 14 | | 9 | | 7 | |
| | Densifying time/min | 253 | | 271 | | 266 | |
| S7 | Initial consistency/Bc | 14 | | 10 | | 8 | |
| | Densifying time/min | 267 | | 281 | | 253 | |
| S8 | Initial consistency/Bc | 13 | | 9 | | 8 | |
| | Densifying time/min | 255 | | 270 | | 250 | |

TABLE 2-continued

|  |  | Temperature/ °C. 120 | Pressure/ MPa 60 | Temperature/ °C. 150 | Pressure/ MPa 80 | Temperature/ °C. 180 | Pressure/ MPa 90 |
|---|---|---|---|---|---|---|---|
| DS2 | Initial consistency/Bc | 19 |  | 9 |  | 3 |  |
|  | Densifying time/min | 177 |  | 251 |  | 110 |  |
| DS3 | Initial consistency/Bc | 5 |  | 3 |  | 2 |  |
|  | Densifying time/min | 322 |  | 263 |  | 188 |  |
| DS4 | Initial consistency/Bc | 21 |  | 16 |  | 3 |  |
|  | Densifying time/min | 244 |  | 285 |  | 153 |  |

Similarly, the high-temperature retarders S2-S8 described in Examples 2-8 and the high-temperature retarders DS2-DS4 prepared in Comparative Examples 2-4 having a mass fraction of 0.7% were added into the cementing slurry prepared according to the Formulation 2 # respectively, and experiments were performed under the densifying condition of the temperature 50-180° C. to test the densifying time of the cement slurry; the results were shown in the above Table 2.

The results in Table 2 indicated that the high temperature retarders S2-S8 prepared in Examples 2-8 of the present disclosure had excellent retarding performance on oil well cement at the temperature of 120-180° C., and exhibited desirable temperature resistance, the high temperature retarders can effectively prolong the densifying time of cement slurry, and meet the requirements of well cementation on the cement slurry under different temperatures; however, the retarders prepared in the Comparative Examples 2-4 had unsatisfactory densifying effect under the temperature of 120-180° C., wherein the temperature resistance of DS2 and DS4 was insufficient, thus the retarders were prone to decompose at high temperature and may cause serious problem of sedimentation; the retardation effect of DS3 will deteriorate after the temperature rise, thus the DS3 had no temperature response characteristic.

In addition, when the temperature was higher than 140° C., the hydrophobic association effect of the side chain of the long carbon chain alkyl disappeared, the functional group with the retardation effect was completely released, then the cement slurry densifying time was shortened along with the temperature rise.

Test Example 2

The high-temperature retarder S1 described in Example 1 and the on-site high-temperature retarder sample DS1 prepared in Comparative Example 1 having a mass fraction of 0%, 0.2%, 0.5%, 0.7% and 1.0% were added into the cementing slurry prepared with Formulation 1 # and the cementing slurry prepared with Formulation 2 # respectively, the curing operation was performed under the conditions of different temperatures and pressures, the upper and lower density difference of the set cement was tested, the temperatures 30° C., 60° C. and 90° C. were selected as low temperatures to simulate the top well cementation environment in a well with large temperature difference, and the compression strength of the set cement was tested to verify the improvement effect of the retarder on the early strength of the top set cement under the large temperature difference condition; the results were shown in Table 3.

TABLE 3

| Formulation | Added amount of retarder/ % | Temperature/ °C. | Pressure/ MPa | Compression strength/MPa (24 h) | Compression strength at top/MPa (24 h) | | | The upper and lower density difference of the set cement/(g/cm³) | |
|---|---|---|---|---|---|---|---|---|---|
| | | | | | 30° C. | 60° C. | 90° C. | S1 prepared in Example 1 | DS1 prepared in Comparative Example 1 |
| 1# | 0.2 | 50 | 0.1 | 21.1 | 18.3 | | | 0.112 | 0.133 |
|  | 0.5 |  |  | 18.7 | 17.6 | | | 0.123 | 0.133 |
| 1# | 0.5 | 90 | 35 | 24.7 | 16.4 | 20.1 | | 0.167 | 0.191 |
|  | 0.7 |  |  | 24.2 | 16.1 | 19.6 | | 0.178 | 0.214 |
|  | 1.0 |  |  | 24.1 | 16.6 | 19.3 | | 0.181 | 0.223 |
| 2# | 0.7 | 120 | 60 | 27.5 | 14.6 | 18.3 | 20.4 | 0.193 | 0.245 |
|  | 1.0 |  |  | 25.9 | 14.4 | 18.2 | 20.1 | 0.199 | 0.263 |
| 2# | 0.7 | 150 | 80 | 28.8 | 13.9 | 17.3 | 19.1 | 0.212 | 0.295 |
|  | 1.0 |  |  | 25.9 | 13.5 | 17.2 | 18.7 | 0.220 | 0.331 |
| 2# | 0.7 | 180 | 90 | 29.8 | 12.5 | 15.9 | 16.9 | 0.216 | 0.339 |
|  | 1.0 |  |  | 27.1 | 12.1 | 15.3 | 16.8 | 0.223 | 0.344 |

The data in Table 3 indicated that the higher was the curing temperature, the greater was the compression strength of the set cement. Because that the cement hydration was accelerated at a high temperature, and more hydrated calcium silicate gel was generated, such that the compression strength of the set cement was improved. The larger was the temperature difference during the curing process, the more was the compression strength of set cement was reduced, it was probably because that the hydration reaction of cement at low temperature was slow, resulting in the low compression strength. In addition, in the present disclosure, the set cement showed excellent early strength and had higher compression strength after being cured for 24 hours under different top temperature conditions. The experimental results showed that the compression strength of the set cement was still more than 12 MPa for 24 hours at the simulated bottom hole circulation temperature of 220° C., the top temperature of 30° C., and the compression strength of the set cement was more than 15 MPa at the top temperature of 60° C. It demonstrated that the high-temperature retarders of present disclosure had small influence on the development of the compression strength of the set cement at low temperature, and can adapt to a wider temperature range and meet the construction requirement of well cementation of the long sealing solid section.

As illustrated from the data in Table 3, when the cement slurry was cured for 24 hours under different temperature conditions, the higher was the temperature, the larger was the difference between the upper density and the lower density of the cement slurry; the high temperature retarder of the present disclosure will slightly increase the difference between the upper density and the lower density of the cement slurry, but the influence was limited. Compared with the difference between the upper density and the lower density of the cement slurry of the Comparative Example 1, the high-temperature retarder of the present disclosure imposed smaller influence on the settlement stability of the cement slurry under large temperature difference.

Similarly, the high-temperature retarders S2-S8 described in the Examples 2-8 and the high-temperature retarders DS2-DS4 prepared in the Comparative Example 2-4 having a mass fraction of 1.0% were added into the cementing slurry prepared with Formulation 2 # respectively, the curing operation was performed under the conditions of a temperature of 180° C. and a pressure of 90 MPa, the upper and lower density difference of the set cement were tested, the temperatures 30° C., 60° C. and 90° C. were selected as low temperatures to simulate the top well cementation environment in a large temperature difference well, and the compression strength of the set cement was tested to verify the improvement effect of the retarder on the early strength of the top set cement under the large temperature difference condition; the results were shown in Table 4.

TABLE 4

| No. | The upper and lower density difference of the set cement/ (g/cm3) | Compression strength/MPa (24 h) | Compression strength at top/MPa (24 h) | | |
|---|---|---|---|---|---|
| | | | 30° C. | 60° C. | 90° C. |
| S2 | 0.225 | 25.9 | 11.6 | 14.8 | 15.5 |
| S3 | 0.231 | 26.3 | 10.9 | 15.3 | 14.1 |
| S4 | 0.245 | 28.4 | 11.2 | 15.3 | 17.2 |
| S5 | 0.241 | 26.5 | 10.5 | 13.5 | 14.4 |
| S6 | 0.233 | 27.1 | 10.5 | 15.2 | 15.8 |
| S7 | 0.251 | 27.5 | 11.5 | 15.6 | 16.4 |

TABLE 4-continued

| No. | The upper and lower density difference of the set cement/ (g/cm3) | Compression strength/MPa (24 h) | Compression strength at top/MPa (24 h) | | |
|---|---|---|---|---|---|
| | | | 30° C. | 60° C. | 90° C. |
| S8 | 0.244 | 26.3 | 10.9 | 14.7 | 15.7 |
| DS2 | 0.369 | 16.8 | 3.1 | 6.2 | 11.3 |
| DS3 | 0.133 | 18.9 | — | 3.6 | 8.9 |
| DS4 | 0.412 | 19.1 | 4.1 | 5.3 | 6.6 |

Note:
"—" indicated that no strength was formed.

Test Example 3

The sensitivity test of added amount was carried out according to the enterprise standard SY/T5504.1-2013 "oil well cement admixture evaluation method part 1: retarder", the added amount of the retarder was increased by 10% to carry out the densifying test on a benchmark formulation at a certain representative temperature point, and the densifying time was read. The sensitivity of added amount of the retarder was calculated according to Formula. The standard index was that the sensitivity of added amount shall be less than or equal to 25%.

The densifying time increase rate was calculated by using the Formula I:

$$R_D = \frac{t_D - t_P}{t_P} \times 100\%$$

Wherein $R_D$ refers to the sensitivity of added amount of the retarders, it is expressed as a percentage;

$t_D$ refers to the densifying time of the cement slurry by 10% addition, its unit is min.

$t_P$ refers to the densifying time of benchmark formulation, its unit is min.

The high-temperature retarders prepared in Example 1 having the mass fractions of 0.5%, 0.55%, 1.0% and 1.1% were added to the cementing slurry prepared with Formulation 1# and the cementing slurry prepared with Formulation 2# respectively, the experiments were performed at the temperature range of 50-150° C., and the experimental results were shown in Table 5 as follows.

TABLE 5

| Formulation | Added amount of retarder/% | Temperature/ ° C. | Pressure/ MPa | Densifying time/ min | Sensitivity of added amount/ % |
|---|---|---|---|---|---|
| 1# | 0.5 | 50 | 0.1 | 346 | 7.5 |
| | 0.55 | | | 372 | |
| 1# | 0.5 | 90 | 35 | 200 | 8.5 |
| | 0.55 | | | 217 | |
| 2# | 0.5 | 120 | 60 | 220 | 7.7 |
| | 0.55 | | | 237 | |
| 2# | 0.5 | 150 | 80 | 256 | 5.9 |
| | 0.55 | | | 271 | |
| 2# | 1.0 | 180 | 90 | 282 | 8.5 |
| | 1.1 | | | 306 | |

As illustrated from the data in Table 5, the change rate of densifying times was less than 10% when an added amount of the retarder was increased. Therefore, the high-temperature retarder has a small sensitivity coefficient of the added amount, and can effectively meet the performance requirement of well cementation engineering and ensure the safety of well cementation construction.

Test Example 4

The temperature sensitivity experiment was performed according to the enterprise standard SY/T5504.1-2013 "oil well cement admixture evaluation method part 1: retarder", the experimental temperature was increased by 5° C. to carry out the densifying test on a benchmark formulation at a certain representative temperature point, and the densifying time was read. The temperature sensitivity of the retarder was calculated according to Formula under a condition that the experimental temperature was increased by 5° C. The standard index was that the temperature sensitivity shall be less than or equal to 20%.

The temperature sensitivity was calculated by using the Formula II:

$$R_T = \frac{|t_P - t_T|}{t_P} \times 100\%$$

Wherein the $R_T$ refers to the temperature sensitivity of retarders, it is expressed as a percentage;

$t_P$ refers to the densifying time of benchmark formulation, its unit is min;

$t_T$ refers to the densifying time of the cement slurry at the test temperature T, its unit is min.

The high temperature retarders prepared in Example 1 having the mass fractions of 0.5% and 1.0% were added to the cementing slurry prepared with Formulation 1# and the cementing slurry prepared with Formulation 2# respectively, and the densifying experiments were performed under the conditions of different temperature and pressure, and the experimental results were shown in Table 6 as follows.

TABLE 6

| Formulation | Added amount of retarder/% | Temperature/° C. | Pressure/MPa | Densifying time/min | Temperature sensitivity/% |
|---|---|---|---|---|---|
| 1# | 0.5 | 50 | 0.1 | 346 | 15.0 |
|    |     | 55 |     | 301 |      |
| 1# | 0.5 | 90 | 0.1 | 200 | 5.2 |
|    |     | 95 |     | 211 |     |
| 2# | 0.5 | 120 | 60 | 220 | 2.9 |
|    |     | 125 |    | 233 |     |
| 2# | 1.0 | 145 | 80 | 351 | 2.6 |
|    |     | 150 |    | 342 |     |
| 2# | 1.0 | 175 | 90 | 309 | 9.6 |
|    |     | 180 |    | 282 |     |

As indicated by the data in Table 6, the temperature sensitivity was less than 20% when the temperature was increased by 5° C. Therefore, the high-temperature retarders had low temperature sensitivity, and can effectively meet the performance requirement of well cementation engineering and ensure the safety of well cementation construction.

Test Example 5

The high temperature retarder described in the Example 1 and the high temperature retarder described in the Comparative Example 1 having a mass fraction of 1.0% were added into the cementing slurry prepared with Formulation 2# respectively, the setting time of cement slurry was tested at the temperature of 50° C., 70° C. and 90° C., and the experimental results were shown in Table 7 as follows.

TABLE 7

| | Types of retarder | | | | | |
|---|---|---|---|---|---|---|
| | Initial setting time/min | | | Final setting time/min | | |
| | 50° C. | 70° C. | 90° C. | 50° C. | 70° C. | 90° C. |
| Example 1 | 1087 | 1023 | 987 | 1334 | 1256 | 1212 |
| Comparative Example 1 | 1423 | 1244 | 1095 | 1759 | 1470 | 1123 |

As can be seen from Table 7, the initial setting times of the cement slurry systems added with the high-temperature retarder at different temperatures are similar, and the differences of setting time were small. However, the initial setting time and final setting time of the cement slurry system added with the Comparative Example 1 (provided by the Engineering Institute of Northwest Oil Field Division of the China Petroleum & Chemical Corporation) were significantly changed along with the temperature rise, and the setting time difference was continuously reduced along with the temperature rise. The temperature rise was proved to obviously enhance the retarding performance of the high-temperature retarder, eliminate the acceleration effect of the temperature rise on the cement hydration process, and demonstrate that the high-temperature retarder had certain response behavior to the temperature and can meet the construction requirement of well cementation of the long sealing solid section.

Test Example 6

The cement slurry was prepared according to the Formulation 1#, the cement slurry system was added with the high-temperature retarders prepared in the Example 1 having different mass fractions such as 0%, 0.5%, 1.0% and 1.5%, respectively, the cement slurry in a constant pressure densifying instrument was heated to 90° C., subjected to densifying process for 30 min, the cement slurry was taken out, the influence of the retarder on the rheological property of the cement slurry was measured. The experimental results are shown in Table 8 as follows.

TABLE 8

| Added amount of retarders/% | Reading of six-speed rotational viscometer | | | | | | | |
|---|---|---|---|---|---|---|---|---|
|   | $\theta_3$ | $\theta_6$ | $\theta_{100}$ | $\theta_{200}$ | $\theta_{300}$ | $\theta_{600}$ | n | K/Pa · S$^n$ |
| 0 | 14 | 25 | 50 | 68 | 91 | 137 | 0.545 | 1.553 |
| 0.5 | 21 | 32 | 65 | 77 | 103 | 144 | 0.419 | 3.858 |
| 1.0 | 13 | 21 | 50 | 75 | 93 | 137 | 0.564 | 1.403 |
| 1.5 | 14 | 26 | 40 | 65 | 80 | 134 | 0.631 | 0.799 |

As can be seen from Table 8, the fluidity of the cement slurry was slightly reduced when the added amount of the retarder increases, compared with the rheological property of the original cement slurry, the retarder had small influence on the cement slurry system on the whole, and the cement slurry was not too thin to cause excessive dispersion while maintaining desirable rheological property. It demonstrated that the present disclosure can avoid the problem of slurry stability caused by excessive dispersion of the cement slurry.

Test Example 7

The cement slurry was prepared according to the Formulation 1#, the high-temperature retarders prepared in the Example 1 having different mass fractions of 0%, 0.5% and 1.0% were added into a cement slurry system for well cementation respectively, the high-temperature retarder and three different commercially available fluid loss agents were thickened for 30 min under the conditions of a temperature of 90° C. and a pressure of 0.1 MPa, and a fluid loss test was performed by using a high-temperature high-pressure fluid loss instrument, the experimental results were shown in the following Table 9. The three fluid loss agents are FS-23L, HX-12L fluid loss agents produced by Chengdu Omax Oilfield Technology Co., Ltd., and SYJ fluid loss agent produced by Shandong Shengli Cementing Engineering Co., Ltd.

TABLE 9

| Types of fluid loss agent | Added amount of fluid loss agent/% | Added amount of retarder/% | API water loss/ml |
| --- | --- | --- | --- |
| FS-23L | 3 | 0 | 30 |
| | | 0.5 | 41 |
| | | 1.0 | 44 |
| HX-12L | 1.5 | 0 | 23 |
| | | 0.5 | 34 |
| | | 1.0 | 38 |
| SYJ | 2 | 0 | 35 |
| | | 0.5 | 44 |
| | | 1.0 | 46 |

As illustrated from the results in Table 9, the water loss amount of the cement slurry increased slightly while the added amount of the retarder increased, because both the retarder and the fluid loss agent had adsorptive effect with the hydration particles during the cement hydration process, the retarder had stronger adsorption performance, and would occupy more adsorption sites on the cement particles. Therefore, when the retarder was used together with a fluid loss agent, the performance of the fluid loss agent tended to deteriorate. However, the water loss shown by the experimental result was within the range required by the standard, the properties of the fluid loss agent were hardly affected, and the performance of cement slurry was not influenced. Therefore, the retarder had desirable compatibility with the three fluid loss agents.

Test Example 8

Three cement brands commonly used for oil field well cementation were selected, the cement slurry was prepared according to the Formulation 2#, the cement slurry system for well cementation was added with the high temperature retarders having different mass fractions of 0.5%, 0.7% and 1.0% respectively, a densifying experiment was performed under the conditions of a temperature of 120° C. and a pressure of 60 MPa, so as to test the influence of the retarder on the densifying time of different oil well cements, thereby investigating the compatibility of the retarder and different oil well cements. The experimental results are shown in Table 10 as follows.

TABLE 10

| Cement type | Added amount of retarder/% | Initial consistency/Bc | Densifying time/min |
| --- | --- | --- | --- |
| Shengwei G grade | 0.5 | 15 | 220 |
| | 0.7 | 14 | 265 |
| | 1.0 | 14 | 312 |
| Jiahua G grade | 0.5 | 13 | 214 |
| | 0.7 | 12 | 288 |
| | 1.0 | 12 | 354 |
| Three gorges G grade | 0.5 | 15 | 187 |
| | 0.7 | 14 | 244 |
| | 1.0 | 14 | 273 |

As illustrated from the Table 10, the high temperature retarder exhibited desirable retarding effect on the G-grade cement slurries of different brands, the densifying times under the same added amount of retarder were similar, and the densifying time was linearly adjustable, which demonstrated that the high temperature retarder had desirable compatibility with oil well cement and can meet the requirement of well cementation.

In conclusion, the high-temperature retarder of the present disclosure can effectively prolong the densifying time of cement slurry under high temperature, increase the early strength of set cement under low temperature; in addition, it can effectively improve the rheological property of the cement slurry and prevent the problem of settlement stability caused by excessive dispersion of the cement slurry. In addition, the high-temperature retarder of the present disclosure has little influence on the API water loss of cement slurry and basically has no influence on the settlement stability of the cement slurry, thereby improving the comprehensive performance of a cement slurry system, thus the high-temperature retarder is very suitable for being used as the retarder of a deep cement slurry system for well cementation.

Example 9

The example illustrated a high temperature retarder prepared with the method of the present disclosure.

The preparation steps were as follows:

(1) 41.4 parts of 2-acrylamide-2-methylpropanesulfonic acid, 52 parts of itaconic acid, 4.95 parts of N, N-dimethylacrylamide and 6 parts of hydrophobic monomer were weighted and dissolved in the deionized water to obtain a solution respectively, wherein the total mass concentration of the monomers in the solution was 35%, and a sodium hydroxide solution with the concentration of 5 mol/L was used for adjusting the pH of said solution to 4;

wherein the rigid hydrophobic monomer had a structure represented by Formula (3-3), and $R_6$ was H, n was 21;

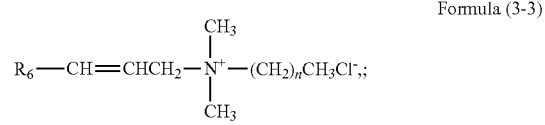

Formula (3-3)

(2) the temperature of the water bath kettle was adjusted to 70° C., and a reaction device was installed, the reaction device including the main components such as a three-neck flask, a precise booster electric stirrer, a constant pressure dropping funnel and so forth. The mixed solution of sodium styrene sulfonate, itaconic acid and hydrophobic monomer was transferred into a three-neck flask, and stirred by a magnetic stirrer, the rotating speed was kept at 300 rpm, nitrogen was introduced into a container to discharge oxygen, 2 parts of ammonium persulfate and 2 parts of sodium bisulfite were respectively weighed to prepare a solution, wherein the mass concentration of an initiator in the solution was 1.0%, when the temperature was raised to 70° C., the initiator was added into the three-neck flask by using a constant pressure dropping funnel, and the added amount of the initiator was 0.2% of the total mass of the monomers.

(3) After the dropwise addition was implemented, the rotation speed was kept unchanged, the reaction was performed at a set temperature for 6 hours, the faint yellow slightly viscous liquid was cooled to room temperature and purified by using acetone for 3 times to prepare the high-temperature retarder for well cementation, wherein the high-temperature retarder was marked as S9.

Wherein the high temperature retarder S9 had a structure:

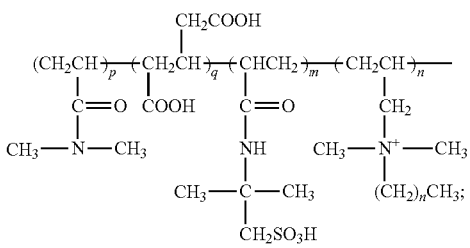

Wherein p=7.53%, q=60.24%, m=30.12%, n=2.11%; and the weight average molecular weight of the high temperature retarder S9 was 110000.

Example 10

The example illustrated a high temperature retarder prepared with the method of the present disclosure.

A high temperature retarder was prepared in the same method as in Example 9, except that the 2-acrylamide-2-methylpropanesulfonic acid, itaconic acid, N, N-dimethylacrylamide and hydrophobic monomer were weighted according to the weight ratio.

The prepared high temperature retarder was marked as S10.

Wherein the high temperature retarder S10 had a structure as follows:

$[CH_2CHM_4]_p$—$[M_1CH_2CHCH_2M_1]_q$—$[CM_2HCH_2]_m$—$[CH_2CM_3HCl\text{-}]_n$; wherein $M_1$ was —COOH, $M_2$ was —CONHC(CH$_3$)$_2$CH$_2$SO$_3$H, $M_3$ was —[NCH$_2$(CH$_3$)$_2$(CH$_2$)$_n$CH$_3$]$^+$, $M_4$ was —CON(CH$_3$)$_2$;

wherein p=9.59%, q=47.93%, m=40.26%, n=2.22%; and the weight average molecular weight of the high temperature retarder S10 was 170000.

Example 11

The example illustrated a high temperature retarder prepared with the method of the present disclosure.

A high temperature retarder was prepared in the same method as in Example 9, except that the 2-acrylamide-2-methylpropanesulfonic acid, itaconic acid, N, N-dimethylacrylamide and hydrophobic monomer were weighted according to the weight ratio.

The prepared high temperature retarder was marked as S11.

Wherein the high temperature retarder S11 had a structure as follows:

$[CH_2CHM_4]_p$—$[M_1CH_2CHCH_2M_1]_q$—$[CM_2HCH_2]_m$—$[CH_2CM_3HCl\text{-}]_n$; wherein $M_1$ was —COOH, $M_2$ was —CONHC(CH$_3$)$_2$CH$_2$SO$_3$H, $M_3$ was —[NCH$_2$(CH$_3$)$_2$(CH$_2$)$_n$CH$_3$]$^+$, $M_4$ was —CON(CH$_3$)$_2$;

wherein p=8.63%, q=51.79%, m=37.98%, n=1.6%; and the weight average molecular weight of the high temperature retarder S11 was 150000.

Example 12

The example illustrated a high temperature retarder prepared with the method of the present disclosure.

A high temperature retarder was prepared in the same method as in Example 9, except that the 2-acrylamide-2-methylpropanesulfonic acid, itaconic acid, N, N-dimethylacrylamide and hydrophobic monomer were weighted according to the weight ratio; and n is 11.

The prepared high temperature retarder was marked as S12.

Wherein the high temperature retarder S12 had a structure as follows:

$[CH_2CHM_4]_p$—$[M_1CH_2CHCH_2M_1]_q$—$[CM_2HCH_2]_m$—$[CH_2CM_3HCl\text{-}]_n$; wherein $M_1$ was —COOH, $M_2$ was —CONHC(CH$_3$)$_2$CH$_2$SO$_3$H, $M_3$ was —[NCH$_2$(CH$_3$)$_2$(CH$_2$)$_n$CH$_3$]$^+$, $M_4$ was —CON(CH$_3$)$_2$;

wherein p=7.61%, q=60.89%, m=30.45%, n=1.05%; and the weight average molecular weight of the high temperature retarder S12 was 200000.

Example 13

The example illustrated a high temperature retarder prepared with the method of the present disclosure.

A high temperature retarder was prepared in the same method as in Example 9, except that the rigid hydrophobic monomer had a structure represented by Formula (3-3), wherein $R_6$ was H, and n was 15.

The prepared high temperature retarder was marked as S13.

Wherein the high temperature retarder S13 had a structure as follows:

$[CH_2CHM_4]_p$—$[M_1CH_2CHCH_2M_1]_q$—$[CM_2HCH_2]_m$—$[CH_2CM_3HCl\text{-}]_n$; wherein $M_1$ was —COOH, $M_2$ was —CONHC(CH$_3$)$_2$CH$_2$SO$_3$H, $M_3$ was —[NCH$_2$(CH$_3$)$_2$(CH$_2$)$_n$CH$_3$]$^+$, $M_4$ was —CON(CH$_3$)$_2$;

wherein p=10.05%, q=40.22%, m=46.25%, n=3.48%; and the weight average molecular weight of the high temperature retarder S13 was 110000.

Example 14

The example illustrated a high temperature retarder prepared with the method of the present disclosure.

A high temperature retarder was prepared in the same method as in Example 9, except that the rigid hydrophobic monomer had a structure represented by Formula (3-3), wherein $R_6$ was H, and n was 17.

The prepared high temperature retarder was marked as S14.

Wherein the high temperature retarder S14 had a structure as follows:

$[CH_2CHM_4]_p$—$[M_1CH_2CHCH_2M_1]_q$—$[CM_2HCH_2]_m$—$[CH_2CM_3HCl\text{-}]_n$; wherein $M_1$ was —COOH, $M_2$ was —CONHC(CH$_3$)$_2$CH$_2$SO$_3$H, M$_3$ was —[NCH$_2$(CH$_3$)$_2$(CH$_2$)$_n$CH$_3$]$^+$, M$_4$ was —CON(CH$_3$)$_2$;

wherein p=7.18%, q=64.66%, m=25.86%, n=2.3%; and
the weight average molecular weight of the high temperature retarder S14 was 110000.

Example 15

The example illustrated a high temperature retarder prepared with the method of the present disclosure.

A high temperature retarder was prepared in the same method as in Example 9, except that the rigid hydrophobic monomer had a structure represented by Formula (3-3), wherein R$_6$ was H, and n was 19.

The prepared high temperature retarder was marked as S15.

Wherein the high temperature retarder S15 had a structure as follows:
[CH$_2$CHM$_4$]$_p$—[M$_1$CH$_2$CHCH$_2$M$_1$]$_q$—[CM$_2$HCH$_2$]$_m$—[CH$_2$CM$_3$HCl-]$_n$; wherein M$_1$ was —COOH, M$_2$ was —CONHC(CH$_3$)$_2$CH$_2$SO$_3$H, M$_3$ was —[NCH$_2$(CH$_3$)$_2$(CH$_2$)$_n$CH$_3$]$^+$, M$_4$ was —CON(CH$_3$)$_2$;

wherein p=10.76%, q=43.02%, m=43.02%, n=1-p-q-m; and
the weight average molecular weight of the high temperature retarder S15 was 150000.

Example 16

The example illustrated a high temperature retarder prepared with the method of the present disclosure.

A high temperature retarder was prepared in the same method as in Example 9, except that the rigid hydrophobic monomer has a structure represented by Formula (3-3), wherein R$_6$ was H, and n was 13.

The prepared high temperature retarder was marked as S16.

Wherein the high temperature retarder S16 had a structure as follows:
[CH$_2$CHM$_4$]$_p$—[M$_1$CH$_2$CHCH$_2$M$_1$]$_q$—[CM$_2$HCH$_2$]$_m$—[CH$_2$CM$_3$HCl-]$_n$; wherein M$_1$ was —COOH, M$_2$ was —CONHC(CH$_3$)$_2$CH$_2$SO$_3$H, M$_3$ was —[NCH$_2$(CH$_3$)$_2$(CH$_2$)$_n$CH$_3$]$^+$, M$_4$ was —CON(CH$_3$)$_2$;

wherein p=7.41%, q=59.16%, m=29.63%, n=3.8%; and
the weight average molecular weight of the high temperature retarder S16 was 100000.

Comparative Example 5

A high temperature retarder was prepared in the same method as in Example 9, except that the on-site high-temperature retarder sample provided by the Engineering Institute of Northwest Oil Field Division of the China Petroleum & Chemical Corporation (Sinopec) was used as the high-temperature retarder. The prepared high temperature retarder was marked as DS5.

Comparative Example 6

A high temperature retarder was prepared in the same method as in Example 9, except that the weight ratio of the used amounts of the 2-acrylamide-2-methylpropanesulfonic acid, the itaconic acid, the N, N-dimethylacrylamide and the hydrophobic monomer was 11.5:4.5:2.48:1.

The prepared high temperature retarder was marked as DS6.

Comparative Example 7

A high temperature retarder was prepared in the same method as in Example 9, except that the used amounts of the 2-acrylamide-2-methylpropanesulfonic acid, the itaconic acid, N, N-dimethylacrylamide and the hydrophobic monomer caused that the prepared high-temperature retarder containing the following structures:

[CH$_2$CHM$_4$]$_p$—[M$_1$CH$_2$CHCH$_2$M$_1$]$_q$—[CM$_2$HCH$_2$]$_m$—[CH$_2$CM$_3$HCl-]$_n$; wherein M$_1$ was —COOH, M$_2$ was —CONHC(CH$_3$)$_2$CH$_2$SO$_3$H, M$_3$ was —[NCH$_2$(CH$_3$)$_2$(CH$_2$)$_n$CH$_3$]$^+$, M$_4$ was —CON(CH$_3$)$_2$;

wherein p=4.21%, q=38.54%, m=51.25%, n=1-p-q-m; and
the weight average molecular weight of the high temperature retarder DS7 was 320000.

Comparative Example 8

A high temperature retarder was prepared in the same method as in Example 9, except that the used amounts of 2-acrylamide-2-methylpropanesulfonic acid, itaconic acid, N, N-dimethylacrylamide and hydrophobic monomer caused that the weight average molecular weight of the prepared high-temperature retarder was 30000.

The prepared high temperature retarder was marked as DS8.

Test Example 9

Figure 3:
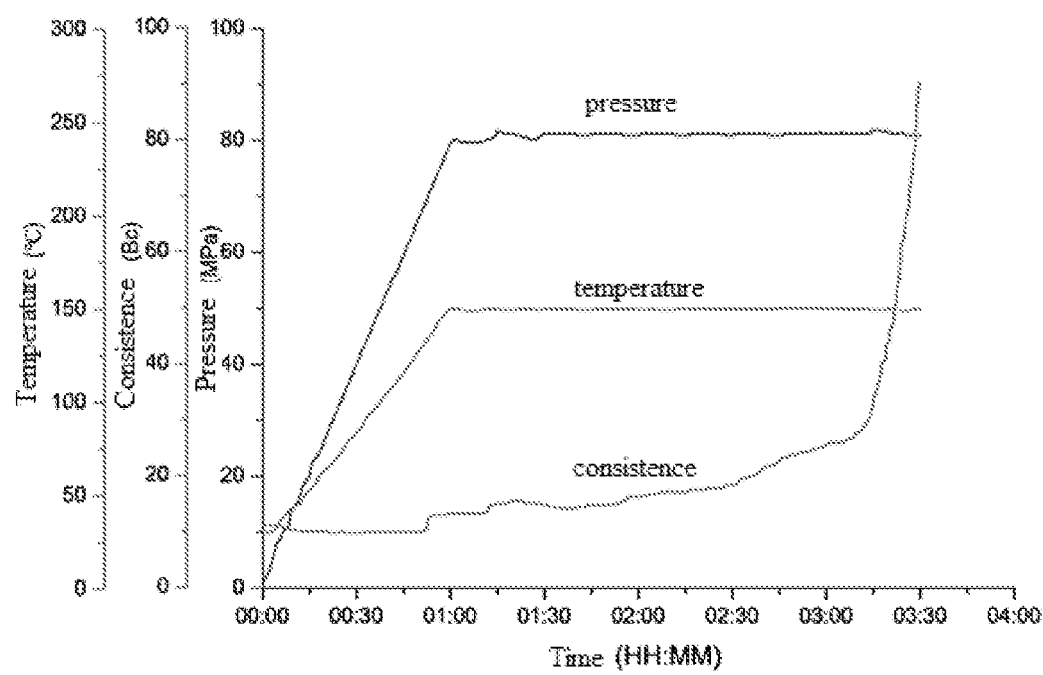
FIG. 3 is a graph showing the densifying curve of retarder at an added amount of 0.5% under the temperature of 150° C. and the pressure of 80 MPa in Example 9 of the present disclosure.

The cement slurry was prepared according to the Formulation 1$^\#$, the high-temperature retarder with the mass fraction of 0.5% and described in the Example 9 was added into a cement slurry system for well cementation, a densifying experiment was carried out under the conditions of a temperature of 150° C. and a pressure of 35 MPa, and the experiment result was shown in FIG. 3.

Figure 4:
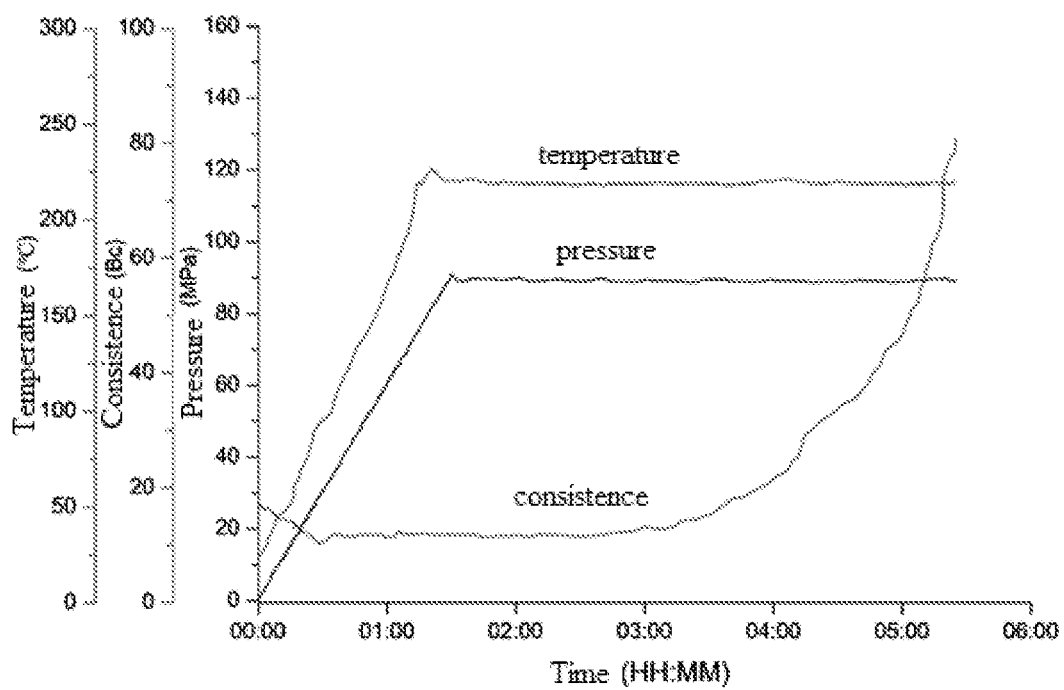
FIG. 4 is a graph showing the densifying curve of retarder at an added amount of 0.5% under the temperature of 220° C. and the pressure of 90 MPa in Example 9 of the present disclosure.

The cement slurry was prepared according to the Formulation 2$^\#$, the high-temperature retarder with the mass fraction of 0.5% and described in the Example 9 was added into a cement slurry system for well cementation, a densifying experiment was carried out under the conditions of a temperature of 180° C. and a pressure of 90 MPa, and the experiment result was shown in FIG. 4.

As can be seen from the results shown in FIG. 3 and FIG. 4, the densifying curve of the cement slurry at different temperatures was stable, there was not abnormal phenomena such as "bulging" and so forth, which indicated that the high-temperature stability of the slurry was excellent, and the transition time period of the densifying curve basically presented a right-angle densifying, which was beneficial to preventing water channeling of the annular and hollow oil & gas, can meet the well cementation construction requirements of high-temperature deep wells, ultra-deep wells and the like, and ensure the well cementation quality.

TABLE 11

| Formulation | Added amount of retarder/% | Temperature/ °C. | Pressure/ MPa | S9 prepared from Example 9 | | DS5 prepared from Comparative Example 5 | |
|---|---|---|---|---|---|---|---|
| | | | | Initial consistency/ Bc | Densifying time/min | Initial consistency/ Bc | Densifying time/min |
| 1# | 0 | 50 | 0.1 | 15 | 188 | 15 | 188 |
| | 0.2 | | 0.1 | 16 | 207 | 8 | 334 |
| | 0.5 | | 0.1 | 15 | 233 | 7 | 412 |
| 1# | 0.5 | 90 | 35 | 15 | 181 | 7 | 232 |
| | 0.7 | | | 15 | 220 | 6 | 262 |
| 2# | 0.5 | 120 | 60 | 15 | 199 | 5 | 211 |
| | 0.7 | | | 14 | 220 | 5 | 243 |
| | 1.0 | | | 13 | 251 | 4 | 324 |
| 2# | 0.5 | 150 | 80 | 13 | 210 | 5 | 162 |
| | 0.7 | | | 13 | 266 | 4 | 211 |
| | 1.0 | | | 12 | 301 | 4 | 249 |
| 2# | 0.5 | 200 | 90 | 9 | 199 | 4 | 143 |
| | 0.7 | | | 8 | 248 | 3 | 177 |
| | 1.0 | | | 7 | 286 | 3 | 198 |
| 2# | 0.7 | 220 | 90 | 9 | 209 | 3 | 129 |
| | 1.0 | | | 9 | 257 | 2 | 158 |
| | 1.5 | | | 8 | 330 | 2 | 177 |

The high-temperature retarder in the Example 9 and the high-temperature retarder DS5 prepared in the Comparative Example 5 having a mass fraction of 0.2-1.5% were added into the cementing slurry prepared with the Formulation 1# and the cementing slurry prepared in the Formulation 2# respectively, and experiments were performed under the densifying condition of the temperature 50-220° C. to test the densifying time of the cement slurry; the results were shown in Table 11.

It was indicated from the experimental results of Table 1 that:

(1) the high-temperature retarder prepared in the Example 9 of the present disclosure had desirable retarding performance on oil well cement under the temperature condition of 50-220° C., and exhibited the excellent temperature resistance, can effectively prolong the densifying time of cement slurry and meet the cementing requirements on the cement slurry at different temperatures.

(2) When the temperature was the same, the densifying time of the cement slurry was prolonged along with an increase of the added amount of the retarder.

(3) Under low temperature (below 90° C.), the retarding group which was not wrapped by the side chain mainly played a role in retarding the hydration of cement, a small amount of the retarding group was released, thus the densifying time was slightly reduced along with the temperature rise. For example, when the added amount was 0.5%, the densifying time of the high-temperature retarder sample S9 was 233 min at the temperature of 50° C., the densifying time of the high-temperature retarder sample S9 was 181 min at 90° C.

(4) When the temperature was higher than 90° C., the retarding group wrapped and covered by the long carbon chain alkyl side chain due to the hydrophobic effect started to gradually spread, when the added amount of the retarder was the same, the densifying time of the cement slurry was slightly prolonged along with the temperature rise.

(5) When the temperature was higher than 180° C., the hydrophobic association effect of the long carbon alkyl side chain disappeared, the functional group with the retardation effect was completely released, and then the densifying time of the cement slurry was shortened along with the temperature rise.

(6) The high-temperature retarder DS5 prepared in Comparative Example 5 had no temperature-adaptive characteristic, and the retarding effect was obviously weakened along with the temperature rise.

Similarly, the high-temperature retarders S10-S16 described in Examples 10-16 and the high-temperature retarders DS6-DS8 prepared in Comparative Examples 6-8 having a mass fraction of 1.0% were added into the cementing slurry prepared according to the Formulation 2# respectively, and experiments were performed under the densifying condition of the temperature 120-220° C. to test the densifying time of the cement slurry; the results were shown in the Table 12.

TABLE 12

| | | Temperature 120° C. | Pressure 60 MPa | Temperature 150° C. | Pressure 80MPa | Temperature 200° C. | Pressure 90MPa | Temperature 220° C. | Pressure 90MPa |
|---|---|---|---|---|---|---|---|---|---|
| S10 | Initial consistency/Bc | | 15 | | 12 | | 8 | | 8 |
| | Densifying time/min | | 248 | | 297 | | 274 | | 259 |
| S11 | Initial consistency/Bc | | 14 | | 13 | | 10 | | 9 |
| | Densifying time/min | | 251 | | 285 | | 266 | | 261 |
| S12 | Initial consistency/Bc | | 15 | | 11 | | 7 | | 8 |

TABLE 12-continued

|  |  | Temperature 120° C. | Pressure 60 MPa | Temperature 150° C. | Pressure 80MPa | Temperature 200° C. | Pressure 90MPa | Temperature 220° C. | Pressure 90MPa |
|---|---|---|---|---|---|---|---|---|---|
|  | Densifying time/min | 242 |  | 270 |  | 255 |  | 243 |  |
| S13 | Initial consistency/Bc | 14 |  | 11 |  | 8 |  | 7 |  |
|  | Densifying time/min | 215 |  | 255 |  | 229 |  | 208 |  |
| S14 | Initial consistency/Bc | 15 |  | 11 |  | 8 |  | 7 |  |
|  | Densifying time/min | 251 |  | 281 |  | 239 |  | 228 |  |
| S15 | Initial consistency/Bc | 16 |  | 11 |  | 8 |  | 7 |  |
|  | Densifying time/min | 222 |  | 274 |  | 296 |  | 211 |  |
| S16 | Initial consistency/Bc | 14 |  | 10 |  | 8 |  | 7 |  |
|  | Densifying time/min | 221 |  | 310 |  | 299 |  | 223 |  |
| DS6 | Initial consistency/Bc | 6 |  | 4 |  | 3 |  | 3 |  |
|  | Densifying time /min | 301 |  | 265 |  | 211 |  | 166 |  |
| DS7 | Initial consistency/Bc | 5 |  | 3 |  | 3 |  | 3 |  |
|  | Densifying time/min | 261 |  | 221 |  | 131 |  | 110 |  |
| DS8 | Initial consistency/Bc | 5 |  | 4 |  | 3 |  | 3 |  |
|  | Densifying time/min | 289 |  | 354 |  | 143 |  | 118 |  |

The results in Table 12 indicated that the high temperature retarders S10-S16 prepared in the Examples 10-16 of the present disclosure had excellent retardation performance for oil well cement at the temperature of 120-220° C., and exhibited desirable temperature resistance, the high temperature retarders can effectively prolong the densifying time of cement slurry, and meet the requirements of well cementation on the cement slurry under different temperatures; the high temperature retarders prepared in Comparative Examples 7-8 had poor retarding effect under the temperature of 120-220° C., and was even decomposed at 200° C. and above to cause failure. The high-temperature retarder prepared in the Comparative Example 6 did not obviously show the temperature-adaptive characteristic, and the retarding effect of the retarder was greatly reduced along with the temperature rise.

In addition, when the temperature was higher than 180° C., the hydrophobic association effect of the side chain of the long carbon chain alkyl disappeared, the functional group with the retardation effect was completely released, and then the retardation effect was slightly reduced along with the temperature rise.

Test Example 10

The high-temperature retarder S9 prepared in the Example 9 and the high-temperature retarder DS5 prepared in the Comparative Example 5 having the mass fraction of 0.2-1.5% were added into the cementing slurry prepared with the Formulation 1# and the cementing slurry prepared with the Formulation 2#. Experiments were carried out under different temperature and pressure conditions, the upper and lower density difference of the set cement was tested, the temperature of 30° C., 60° C. and 90° C. were selected as low temperature to simulate the top well cementing environment in a well with large temperature difference, and the compression strength of the set cement was tested to verify the improvement effect of the retarder on the early strength of the top set cement under the large temperature difference condition; the results were shown in Table 13.

TABLE 13

| Formulation | Added amount of retarder/% | Temperature/° C. | Pressure/MPa | Compression strength/MPa (24 h) | Compression strength at top/MPa (24 h) 30° C. | 60° C. | 90° C. | The upper and lower density difference of the set cement/(g/cm$^3$) S9 prepared in Example 9 | DS5 prepared in Comparative Example 5 |
|---|---|---|---|---|---|---|---|---|---|
| 1# | 0.2 | 50 | 0.1 | 24.4 | 21.5 |  |  | 0.121 | 0.133 |
|  | 0.5 |  |  | 23.8 | 19.3 |  |  | 0.124 | 0.133 |
| 1# | 0.5 | 90 | 35 | 26.9 | 18.4 | 21.1 |  | 0.160 | 0.191 |
|  | 0.7 |  |  | 26.4 | 18.5 | 19.6 |  | 0.172 | 0.214 |
|  | 1.0 |  |  | 26.1 | 18.1 | 19.3 |  | 0.177 | 0.223 |

TABLE 13-continued

| Formulation | Added amount of retarder/ % | Temperature/ ° C. | Pressure/ MPa | Compression strength/MPa (24 h) | Compression strength at top/MPa (24 h) | | | The upper and lower density difference of the set cement/(g/cm³) | |
|---|---|---|---|---|---|---|---|---|---|
| | | | | | 30° C. | 60° C. | 90° C. | S9 prepared in Example 9 | DS5 prepared in Comparative Example 5 |
| 2# | 0.7 | 120 | 60 | 27.5 | 16.6 | 18.3 | 25.4 | 0.188 | 0.245 |
| | 1.0 | | | 26.9 | 16.4 | 18.2 | 24.5 | 0.191 | 0.263 |
| 2# | 0.7 | 150 | 80 | 27.8 | 15.5 | 17.6 | 23.1 | 0.185 | 0.295 |
| | 1.0 | | | 27.1 | 14.8 | 17.2 | 22.7 | 0.193 | 0.331 |
| 2# | 0.7 | 200 | 90 | 28.9 | 12.7 | 15.1 | 20.7 | 0.212 | 0.362 |
| | 1.0 | | | 29.3 | 12.1 | 14.9 | 19.3 | 0.223 | 0.382 |
| 2# | 1.0 | 220 | 90 | 29.8 | 11.2 | 14.3 | 17.8 | 0.231 | 0.398 |
| | 1.5 | | | 28.5 | 10.7 | 14.1 | 17.4 | 0.238 | 0.423 |

The data in Table 13 indicated that the higher was the curing temperature, the greater was the compression strength of the set cement. Because that the cement hydration was accelerated at a high temperature, and more hydrated calcium silicate gel was generated, such that the compression strength of the set cement was improved. The larger was the temperature difference during the curing process, the more was the compression strength of set cement was reduced, it was probably because that the hydration reaction of cement at low temperature was slow, resulting in the low compression strength. In addition, in the present disclosure, the set cement showed excellent early strength and had higher compression strength after being cured for 24 hours under different top temperature conditions. The experimental results showed that the compression strength of the set cement was still more than 10 MPa for 24 hours at the simulated bottom hole circulation temperature of 220° C., the top temperature of 30° C., and the compression strength of the set cement was more than 14 MPa at the top temperature of 60° C. It demonstrated that the high-temperature retarders of present disclosure had small influence on the development of the compression strength of the set cement at low temperature, and can adapt to a wider temperature range and meet the construction requirement of well cementation of the long sealing solid section.

As illustrated from the data in Table 13, when the cement slurry was cured for 24 hours under different temperature conditions, the higher was the temperature, the larger was the difference between the upper density and the lower density of the cement slurry; the high temperature retarder of the present disclosure will slightly increase the difference between the upper density and the lower density of the cement slurry, but the influence was limited. Compared with the difference between the upper density and the lower density of the cement slurry of the Comparative Example 5, the high-temperature retarder of the present disclosure imposed smaller influence on the settlement stability of the cement slurry under large temperature difference.

TABLE 14

| No. | The upper and lower density difference of the set cement/ (g/cm³) | Compression strength/MPa (24 h) | Compression strength at top/MPa (24 h) | | |
|---|---|---|---|---|---|
| | | | 30° C. | 60° C. | 90° C. |
| S10 | 0.301 | 27.3 | 9.8 | 13.9 | 14.2 |
| S11 | 0.289 | 27.8 | 10.9 | 14.6 | 16.8 |
| S12 | 0.266 | 27.1 | 8.7 | 12.2 | 13.9 |
| S13 | 0.273 | 26.5 | 8.2 | 12.7 | 14.6 |
| S14 | 0.259 | 27.5 | 9.3 | 11.9 | 13.3 |
| S15 | 0.241 | 28.1 | 9.1 | 12.1 | 16.9 |
| S16 | 0.299 | 25.1 | 9.3 | 12.8 | 14.4 |
| DS6 | 0.388 | 21.2 | 3.3 | 6.8 | 15.7 |
| DS7 | 0.402 | 22.3 | 4.2 | 8.3 | 14.5 |
| DS8 | 0.536 | 18.5 | — | 4.5 | 7.7 |

Note:
"—" indicated that no strength was formed.

Similarly, the high-temperature retarders S10-S16 described in the Examples 10-16 and the high-temperature retarders DS6-DS8 prepared in the Comparative Example 6-8 having a mass fraction of 1.5% were added into the cementing slurry prepared with Formulation 2# respectively, the curing operation was performed under the conditions of a temperature of 220° C. and a pressure of 90 MPa, the upper and lower density difference of the set cement were tested, the temperatures 30° C., 60° C. and 90° C. were selected as low temperatures to simulate the top well cementation environment in a large temperature difference well, and the compression strength of the set cement was tested to verify the improvement effect of the retarder on the early strength of the top set cement under the large temperature difference condition; the results were shown in Table 14.

Test Example 11

The sensitivity test of added amount was carried out according to the enterprise standard SY/T5504.1-2013 "oil well cement admixture evaluation method part 1: retarder", as described above, the sensitivity test process will not be repeated herein.

TABLE 15

| Formulation | Added amount of retarder/ % | Temperature/ ° C. | Pressure/ MPa | Densifying time/min | Sensitivity of added amount/ % |
|---|---|---|---|---|---|
| 1# | 0.5 | 50 | 0.1 | 233 | 6.9 |
| | 0.55 | | | 249 | |
| 1# | 0.5 | 90 | 35 | 181 | 8.8 |
| | 0.55 | | | 197 | |

TABLE 15-continued

| Formulation | Added amount of retarder/% | Temperature/°C | Pressure/MPa | Densifying time/min | Sensitivity of added amount/% |
|---|---|---|---|---|---|
| 2# | 1<br>1.1 | 120 | 60 | 251<br>269 | 7.2 |
| 2# | 1.0<br>1.1 | 150 | 80 | 301<br>321 | 6.6 |
| 2# | 1.0<br>1.1 | 200 | 90 | 286<br>306 | 7.0 |
| 2# | 1.0<br>1.1 | 220 | 90 | 257<br>266 | 3.5 |

The high-temperature retarders prepared in Example 9 having the mass fractions of 0.5-1.1% were added to the cementing slurry prepared with Formulation 1# and the cementing slurry prepared with Formulation 2# respectively, the experiments were performed at the temperature range of 50-220° C., and the experimental results were shown in Table 15.

As illustrated from the data in Table 15, the change rate of densifying times was less than 10% when an added amount of the retarder was increased. Therefore, the high-temperature retarder has a small sensitivity coefficient of the added amount, and can effectively meet the performance requirement of well cementation engineering and ensure the safety of well cementation construction.

Test Example 12

The temperature sensitivity experiment was performed according to the enterprise standard SY/T5504.1-2013 "oil well cement admixture evaluation method part 1: retarder", as described above, the temperature sensitivity experiment process will not be repeated herein.

TABLE 16

| Formulation | Added amount of retarder/% | Temperature/°C | Pressure/MPa | Densifying time/min | Temperature sensitivity/% |
|---|---|---|---|---|---|
| 1# | 0.5 | 50<br>55 | 0.1 | 233<br>219 | 6.4 |
| 1# | 0.5 | 90<br>95 | 0.1 | 181<br>191 | 5.2 |
| 2# | 1.0 | 120<br>125 | 60 | 251<br>267 | 6.0 |
| 2# | 1.0 | 150<br>155 | 80 | 301<br>292198 | 3.1 |
| 2# | 1.5 | 195<br>200 | 90 | 303<br>286 | 5.9 |
| 2# | 1.5 | 215<br>220 | 90 | 344<br>330 | 4.2 |

The high temperature retarders prepared in Example 9 having the mass fractions of 0.5-1.5% were added to the cementing slurry prepared with Formulation 1# and the cementing slurry prepared with Formulation 2# respectively, and the densifying experiments were performed under the conditions of different temperature and pressure, the experimental results were shown in Table 6. As indicated by the data in Table 16, the temperature sensitivity was less than 20% when the temperature was increased by 5° C. Therefore, the high-temperature retarders had low temperature sensitivity, and can effectively meet the performance requirement of well cementation engineering and ensure the safety of well cementation construction.

Test Example 13

The high temperature retarder described in the Example 9 and the high temperature retarder described in the Comparative Example 5 having a mass fraction of 0.7% were added into the cementing slurry prepared with Formulation 2# respectively, the setting time of cement slurry was tested at the temperature of 50° C., 70° C. and 90° C., and the experimental results were shown in Table 17 as follows.

TABLE 17

| | Types of retarder | | | | | |
|---|---|---|---|---|---|---|
| | Initial setting time/min | | | Final setting time/min | | |
| | 50° C. | 70° C. | 90° C. | 50° C. | 70° C. | 90° C. |
| Example 9 | 1089 | 1024 | 886 | 1233 | 1162 | 1031 |
| Comparative Example 5 | 1223 | 1044 | 895 | 1559 | 1270 | 923 |

As can be seen from Table 17, the initial setting times of the cement slurry systems added with the high-temperature retarder at different temperatures are similar, and the differences of setting time were small. However, the initial setting time and final setting time of the cement slurry system added with the Comparative Example 5 (provided by the Engineering Institute of Northwest Oil Field Division of the China Petroleum & Chemical Corporation) were significantly changed along with the temperature rise, and the setting time difference was continuously reduced along with the temperature rise. The temperature rise was proved to obviously enhance the retarding performance of the high-temperature retarder, eliminate the acceleration effect of the temperature rise on the cement hydration process, and demonstrate that the high-temperature retarder had certain response behavior to the temperature and can meet the construction requirement of well cementation of the long sealing solid section.

Test Example 14

The cement slurry was prepared according to the Formulation 2#, the cement slurry system was added with the high-temperature retarders prepared in the Example 9 having different mass fractions respectively, the cement slurry in a constant pressure densifying instrument was heated to 220° C., subjected to densifying process for 30 min with a continuous stirring process, then cooled to a temperature of 90° C., the cement slurry was taken out, the influence of the retarder on the rheological property of the cement slurry was measured. The experimental results are shown in Table 18 as follows.

TABLE 18

| Added amount of retarders/% | Reading of six-speed rotational viscometer | | | | | | n | $K/Pa \cdot S^n$ |
|---|---|---|---|---|---|---|---|---|
| | $\theta_3$ | $\theta_6$ | $\theta_{100}$ | $\theta_{200}$ | $\theta_{300}$ | $\theta_{600}$ | | |
| 0.5 | 35 | 29 | 55 | 70 | 88 | 137 | 0.427835 | 3.119931 |
| 0.7 | 24 | 24 | 41 | 58 | 78 | 130 | 0.585435 | 1.034928 |
| 1.0 | 16 | 19 | 40 | 55 | 75 | 120 | 0.57221 | 1.08067 |
| 1.5 | 14 | 18 | 38 | 49 | 70 | 116 | 0.55609 | 1.11524 |

As can be seen from Table 18, the fluidity of the cement slurry is slightly increased under the condition of a temperature of 200° C. and a pressure of 90 MPa when the retarder is in Formulation of high added amount, the retarder had small influence on the cement slurry system on the whole, and the cement slurry still maintained the desirable rheological property. The cement slurry was not too thin to cause excessive dispersion while maintaining desirable rheological property. It demonstrated that the present disclosure can avoid the problem of slurry stability caused by excessive dispersion of the cement slurry.

Test Example 15

The cement slurry was prepared according to the Formulation 1#, the high-temperature retarders prepared in the Example 9 having different mass fractions were added into a cement slurry system for well cementation respectively, the high-temperature retarder and three different commercially available fluid loss agents were thickened for 30 min under the conditions of a temperature of 90° C. and a pressure of 0.1 MPa, and a fluid loss test was performed by using a high-temperature high-pressure fluid loss instrument, the experimental results were shown in Table 19. The three fluid loss agents are FS-23L, HX-12L fluid loss agents produced by Chengdu Omax Oilfield Technology Co., Ltd., and SYJ fluid loss agent produced by Shandong Shengli Cementing Engineering Co., Ltd.

As illustrated from the results in Table 19, the water loss amount of the cement slurry increased slightly while the added amount of the retarder increased, because both the retarder and the fluid loss agent had adsorptive effect with the hydration particles during the cement hydration process, the retarder had stronger adsorption performance, and would occupy more adsorption sites on the cement particles. Therefore, when the retarder was used together with a fluid loss agent, the performance of the fluid loss agent tended to deteriorate. However, the water loss shown by the experimental result was within the range required by the standard, the properties of the fluid loss agent were hardly affected, and the performance of cement slurry was not influenced. Therefore, the retarder had desirable compatibility with the three fluid loss agents.

TABLE 19

| Types of fluid loss agent | Added amount of fluid loss agent/% | Added amount of retarder/% | API water loss/ml |
|---|---|---|---|
| FS-23L | 3 | 0 | 30 |
| | | 0.5 | 32 |
| | | 1.0 | 38 |
| HX-12L | 1.5 | 0 | 23 |
| | | 0.5 | 22 |
| | | 1.0 | 26 |
| SYJ | 2 | 0 | 35 |
| | | 0.5 | 37 |
| | | 1.0 | 42 |

Test Example 16

Three cement brands commonly used for oil field well cementation were selected, the cement slurry was prepared according to the Formulation 2#, the cement slurry system for well cementation was added with the high temperature retarders having different mass fractions respectively, a densifying experiment was performed under the conditions of a temperature of 120° C. and a pressure of 60 MPa, so as to test the influence of the retarder on the densifying time of different oil well cements, thereby investigating the compatibility of the retarder and different oil well cements. The experimental results are shown in Table 20 as follows.

TABLE 20

| Cement type | Added amount of retarder/% | Initial consistency/Bc | Densifying time/min |
|---|---|---|---|
| Shengwei G grade | 0.5 | 15 | 199 |
| | 0.7 | 14 | 220 |
| | 1.0 | 13 | 251 |
| Jiahua G grade | 0.5 | 13 | 211 |
| | 0.7 | 14 | 267 |
| | 1.0 | 14 | 301 |
| Three gorges G grade | 0.5 | 14 | 209 |
| | 0.7 | 15 | 238 |
| | 1.0 | 15 | 267 |

As illustrated from the Table 20, the high temperature retarder exhibited desirable retarding effect on the G-grade cement slurries of different brands, the densifying times under the same added amount of retarder were similar, and the densifying time was linearly adjustable, which demonstrated that the high temperature retarder had desirable compatibility with oil well cement and can meet the requirement of well cementation.

The above content describes in detail the preferred embodiments of the invention, but the invention is not limited thereto. A variety of simple modifications can be made to the technical solutions of the invention within the scope of the technical concept of the invention, including a combination of individual technical features in any other suitable manner, such simple modifications and combinations thereof shall also be regarded as the content disclosed by the present invention, each of them falls into the protection scope of the present invention.

The invention claimed is:

1. A high-temperature retarder comprising a structural unit E shown in Formula (5), a structural unit B shown in Formula (2), a structural unit C shown in Formula (3) and a structural unit D shown in Formula (4);

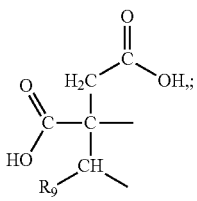

Formula (5)

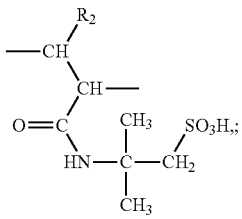

Formula (2)

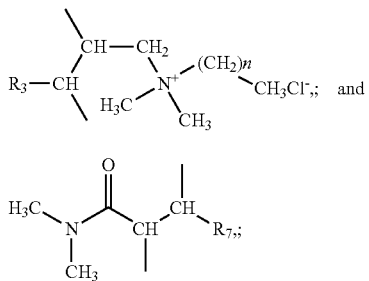

Formula (3)

$$H_3C\diagdown N \diagup \underset{CH_3}{\overset{O}{\parallel}} \diagup CH \diagdown R_7;$$

Formula (4)

wherein the molar percentages of structural units E, B, C and D are q, m, n and p, respectively, and p=7.18-10.76%, q=40.22-64.66%, m=25.86-46.25%, n=1.05-3.8%, and the sum of p, q, m, n is 1;

wherein $R_9$, $R_2$, $R_3$ and $R_7$ are the same or different, and each is independently H or a substituted or unsubstituted alkyl of $C_1$-$C_4$;

wherein n in —$(CH_2)_n$— of Formula (3) is 11, 13, 15, 17, 19 and 21.

2. The high temperature retarder of claim 1, wherein $R_9$, $R_2$, $R_3$ and $R_7$ are identical or different, each is independently H, methyl, ethyl, n-propyl, isopropyl or butyl; the n in —$(CH_2)_n$— of Formula (3) is 15, 17, 19 and 21.

3. The high temperature retarder of claim 2, wherein each of $R_9$, $R_2$, $R_3$ and $R_7$ is independently H.

4. The high temperature retarder of claim 1, wherein the weight average molecular weight of the high temperature retarder is within a range of 90000-210000.

5. The high temperature retarder of claim 4, wherein the weight average molecular weight of the high temperature retarder is within a range of 110000-170000.

6. A cementing slurry comprising the high temperature retarder of claim 1, wherein the dosage of the high temperature retarder is 0.2-2 wt % based on the total weight of the cementing slurry.

* * * * *